US012575018B2

(12) United States Patent
Gribb et al.

(10) Patent No.: US 12,575,018 B2
(45) Date of Patent: Mar. 10, 2026

(54) CATHODE END COOLING SYSTEMS FOR PLASMA WINDOWS POSITIONED IN A BEAM ACCELERATOR SYSTEM

(71) Applicant: SHINE Technologies, LLC, Janesville, WI (US)

(72) Inventors: Tye Gribb, Fitchburg, WI (US); Preston Barrows, Madison, WI (US)

(73) Assignee: SHINE Technologies, LLC, Janesville, WI (US)

( * ) Notice: Subject to any disclaimer, the term of this patent is extended or adjusted under 35 U.S.C. 154(b) by 116 days.

(21) Appl. No.: 18/144,675

(22) Filed: May 8, 2023

(65) Prior Publication Data

US 2024/0381520 A1 Nov. 14, 2024

(51) Int. Cl.
*H05H 1/54* (2006.01)
*H05H 1/02* (2006.01)

(52) U.S. Cl.
CPC ................ *H05H 1/54* (2013.01); *H05H 1/02* (2013.01); *H05H 2242/10* (2013.01)

(58) Field of Classification Search
None
See application file for complete search history.

(56) References Cited

U.S. PATENT DOCUMENTS 3,892,970 A * 7/1975 Freeman .................. H05H 1/22 250/493.1
4,682,564 A * 7/1987 Cann ........................ H05H 1/54 118/721
RE34,806 E * 12/1994 Cann ..................... C23C 16/513 422/186.21
5,519,738 A * 5/1996 Hirose ..................... G21G 1/10 376/195
5,578,831 A 11/1996 Hershcovitch
(Continued)

FOREIGN PATENT DOCUMENTS

CN 110708857 A 1/2020
WO 2013116787 A1 8/2013
(Continued)

OTHER PUBLICATIONS

Kroesen, et al., "Description of a Flowing Cascade Arc Plasma," Plasma Chemistry and Plasma Processing, vol. 10, No. 4, 1990.
(Continued)

*Primary Examiner* — Srinivas Sathiraju
(74) *Attorney, Agent, or Firm* — Dinsmore & Shohl LLP

(57) ABSTRACT

A beam accelerator system comprises an ion accelerator that generates a high-energy ion beam, a low-pressure chamber, an anode adjacent and fluidly connected to the low-pressure chamber, a plasma window adjacent and fluidly connected to the anode, and a cathode housing block adjacent and fluidly connected to the plasma window. The plasma window comprises a plurality of cooling plates, each cooling plate comprising an aperture that is aligned with an aperture in one or more adjacent cooling plate to form a plasma channel. The cathode housing block comprises a cathode target region and a cooling portion. The cooling portion comprises a fluid inlet, a fluid outlet, a cooling channel fluidly coupling the fluid inlet and the fluid outlet, and an opening adjacent to the plasma window and aligned with a longitudinal axis of the plasma channel.

20 Claims, 14 Drawing Sheets

(56) References Cited

U.S. PATENT DOCUMENTS

| | | | | | |
|---|---|---|---|---|---|
| 5,917,874 | A * | 6/1999 | Schlyer | H05H 6/00 376/202 |
| 6,121,569 | A * | 9/2000 | Miley | F03H 1/00 219/121.36 |
| 6,436,252 | B1 * | 8/2002 | Tzatzov | H01J 37/3405 204/192.12 |
| 6,528,948 | B1 | 3/2003 | Hershcovitch et al. | |
| 6,543,424 | B1 * | 4/2003 | Yamaguchi | F04B 53/14 123/495 |
| 6,724,003 | B1 * | 4/2004 | Doi | B01D 53/60 250/492.3 |
| 6,875,331 | B2 * | 4/2005 | Herchen | C25D 7/123 204/266 |
| 7,703,413 | B2 * | 4/2010 | Miebach | H05H 1/34 156/345.43 |
| 9,734,926 | B2 | 8/2017 | Piefer | |
| 11,037,765 | B2 * | 6/2021 | Lane | H01J 37/32247 |
| 11,315,700 | B2 * | 4/2022 | Strangis | H05H 6/00 |
| 11,410,786 | B2 * | 8/2022 | Murakami | G21G 1/10 |
| 11,834,204 | B1 * | 12/2023 | Gorokhovsky | B64G 1/413 |
| 11,896,041 | B2 * | 2/2024 | Currie | A23B 2/503 |
| 12,014,838 | B2 * | 6/2024 | Rotsch | H05H 6/00 |
| 2003/0049468 | A1 | 3/2003 | Hu et al. | |
| 2003/0140988 | A1 * | 7/2003 | Gandikota | H01L 21/76877 257/E21.174 |
| 2004/0100214 | A1 | 5/2004 | Erdman | |
| 2004/0245085 | A1 * | 12/2004 | Srinivasan | B82Y 30/00 422/186.01 |
| 2005/0284374 | A1 * | 12/2005 | Miebach | H05H 1/34 118/723 E |
| 2008/0277004 | A1 * | 11/2008 | Hagseth | B64C 23/005 137/803 |
| 2009/0090875 | A1 * | 4/2009 | Gelbart | G21K 1/14 250/492.1 |
| 2011/0091000 | A1 * | 4/2011 | Stubbers | G21B 1/19 376/109 |
| 2017/0251547 | A1 * | 8/2017 | Ito | H05H 6/00 |
| 2017/0301410 | A1 | 10/2017 | Stubbers et al. | |
| 2017/0330739 | A1 | 11/2017 | Hosaka | |
| 2018/0190471 | A1 | 7/2018 | Budge | |
| 2018/0206323 | A1 | 7/2018 | Kobernik et al. | |
| 2019/0239332 | A1 * | 8/2019 | Hidding | H01S 3/0903 |
| 2019/0257263 | A1 * | 8/2019 | Weber | C23C 28/021 |
| 2019/0259505 | A1 * | 8/2019 | Murakami | H05H 6/00 |
| 2019/0287775 | A1 * | 9/2019 | Newton | H01J 49/0054 |
| 2020/0281067 | A1 * | 9/2020 | Lundin | H05H 1/46 |
| 2021/0158987 | A1 | 5/2021 | Johnson et al. | |
| 2022/0068510 | A1 * | 3/2022 | Gonzalez | G21B 1/13 |
| 2022/0270775 | A1 | 8/2022 | Piefer | |
| 2022/0359492 | A1 | 11/2022 | Liu | |
| 2024/0107653 | A1 * | 3/2024 | Gribb | H05H 3/06 |
| 2024/0297017 | A1 * | 9/2024 | Barrows | H01J 37/3244 |
| 2024/0381520 | A1 * | 11/2024 | Gribb | H05H 1/54 |
| 2025/0015309 | A1 * | 1/2025 | Mills | H01M 10/399 |

FOREIGN PATENT DOCUMENTS

| | | | | |
|---|---|---|---|---|
| WO | WO-2022125912 | A1 * | 6/2022 | H05H 1/06 |
| WO | 2024081327 | A1 | 4/2024 | |
| WO | WO-2024233630 | A2 * | 11/2024 | H05H 1/02 |

OTHER PUBLICATIONS

Vijvers, W. A. J. (2011). A high-flux cascaded arc hydrogen plasma source. Technische Universiteit Eindhoven. https://doi.org/10.6100/IR710985.

Koma et al., "Demonstration of Plasma Window with 20 mm Diameter and Pressure Separation for Accelerator Applications," Plasma and Fusion Research, 2019, vol. 14, pp. 1206148.

Krasik et al., "Plasma window characterization," Journal of Applied Physics 101, 053305 (2007).

Huang et al., "Quantitative characterization of arc discharge as vacuum interface," Physics of Plasmas 21, 123511 (2014); doi: 10-1063/1.4903462.

International Search Report and Written Opinion dated Aug. 27, 2024, pertaining to Int'l Patent Application No. PCT/US24/28310, 8 pgs.

De Beer et al. "Performance of a Plasma Window for a High Pressure Differentially Pumped Deuterium Gas Target for Mono-Energetic Fast Neutron Production—Preliminary Results" Nuclear Instruments and Methods in Physics Research B 170 (2000) 259-265.

Blatz et al. "A Plasma-Window Enhanced Accelerator-Based Deuterium-Tritium Neutron Generator System", Fusion Science and Technology, 2023 American Nuclear Society, DOI: https://doi.org/10.1080/15361055.2023.2167458, 14 pgs.

Hershcovitch "A Plasma Window for Vacuum—Atmosphere Interface and Focusing Lens of Sources for Non-Vacuum Ion Material Modification", AGS Department, Brookhaven National Laboratory, 23 pgs.

* cited by examiner

CATHODE END COOLING SYSTEMS FOR PLASMA WINDOWS POSITIONED IN A BEAM ACCELERATOR SYSTEM

STATEMENT REGARDING FEDERALLY SPONSORED RESEARCH AND DEVELOPMENT

The present disclosure was developed with Government support under Contract No. DE-AR0001377 awarded by the United States Department of Energy. The Government has certain rights in the present disclosure.

BACKGROUND

Field

The present specification generally relates to cathode end cooling systems of plasma window systems, particularly plasma window systems used in a beam accelerator system, such as, for example, a gaseous-target neutron generation system.

Technical Background

Beam accelerator systems are used to produce medical-grade radioactive isotopes used by doctors in nuclear medicine. Generally speaking, beam accelerator systems include an ion accelerator that generates a high-energy ion beam that is directed to a target chamber through a plasma window. For instance, in gaseous-target neutron generation systems, a high-energy ion beam is directed to a gaseous target. The generation and movement of the high-energy ion beam to the target requires a significant amount of energy and generates a significant amount of heat.

Accordingly, a need exists for components of beam accelerator systems, such as gaseous-target neutron generation systems, that help reduce the cost and energy required to generate neutrons and, potentially, radioactive isotopes.

SUMMARY

According to one embodiment, a beam accelerator system comprises: an ion accelerator that generates a high-energy ion beam; a low-pressure chamber; an anode adjacent and fluidly connected to the low-pressure chamber; a plasma window adjacent and fluidly connected to the anode, the plasma window comprising a plurality of cooling plates, each cooling plate comprising an aperture that is aligned with an aperture in one or more adjacent cooling plate to form a plasma channel; and a cathode housing block adjacent and fluidly connected to the plasma window, the cathode housing block comprising a cathode target region and a cooling portion. The cooling portion may comprise a fluid inlet, a fluid outlet, a cooling channel fluidly coupling the fluid inlet and the fluid outlet, and an opening adjacent to the plasma window and aligned with a longitudinal axis of the plasma channel. The cooling portion may define a wall of the cathode target region, the wall having a first side and a second side opposite the first side, wherein the first side of the wall faces toward a cathode end cooling plate of the plurality of cooling plates, and the second side of the wall faces toward the cathode target region.

According to one embodiment, a beam accelerator system comprises: an ion accelerator that generates a high-energy ion beam; a low-pressure chamber; an anode adjacent and fluidly connected to the low-pressure chamber; a plasma window adjacent and fluidly connected to the anode, the plasma window comprising a plurality of cooling plates, each cooling plate comprising an aperture that is aligned with an aperture in one or more adjacent cooling plate to form a plasma channel; a cathode housing block adjacent and fluidly connected to the plasma window, the cathode housing block comprising a cathode target region and a cooling portion, wherein the cooling portion comprises a fluid inlet, a fluid outlet, a cooling channel fluidly coupling the fluid inlet and the fluid outlet, and an opening adjacent to the plasma window and aligned with a longitudinal axis of the plasma channel; and an O-ring positioned between the cooling portion of the cathode housing block and a cathode end cooling plate of the plurality of cooling plates, wherein the cooling channel extends within the cooling portion adjacent to the O-ring.

According to one embodiment, a beam accelerator system comprises: an ion accelerator that generates a high-energy ion beam; a low-pressure chamber; an anode adjacent and fluidly connected to the low-pressure chamber; a plasma window adjacent and fluidly connected to the anode, the plasma window comprising a plurality of cooling plates, each cooling plate comprising an aperture that is aligned with an aperture in one or more adjacent cooling plate to form a plasma channel; a cathode housing block adjacent and fluidly connected to the plasma window, the cathode housing block comprising a cathode target region and a cooling portion, wherein the cooling portion comprises a fluid inlet, a fluid outlet, a cooling channel fluidly coupling the fluid inlet and the fluid outlet, and an opening adjacent to the plasma window and aligned with a longitudinal axis of the plasma channel; and an O-ring positioned between the cooling portion of the cathode housing block and a cathode end cooling plate of the plurality of cooling plates, wherein the cooling channel extends within the cooling portion at a radial distance from the longitudinal axis that is less than a radius of the O-ring.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
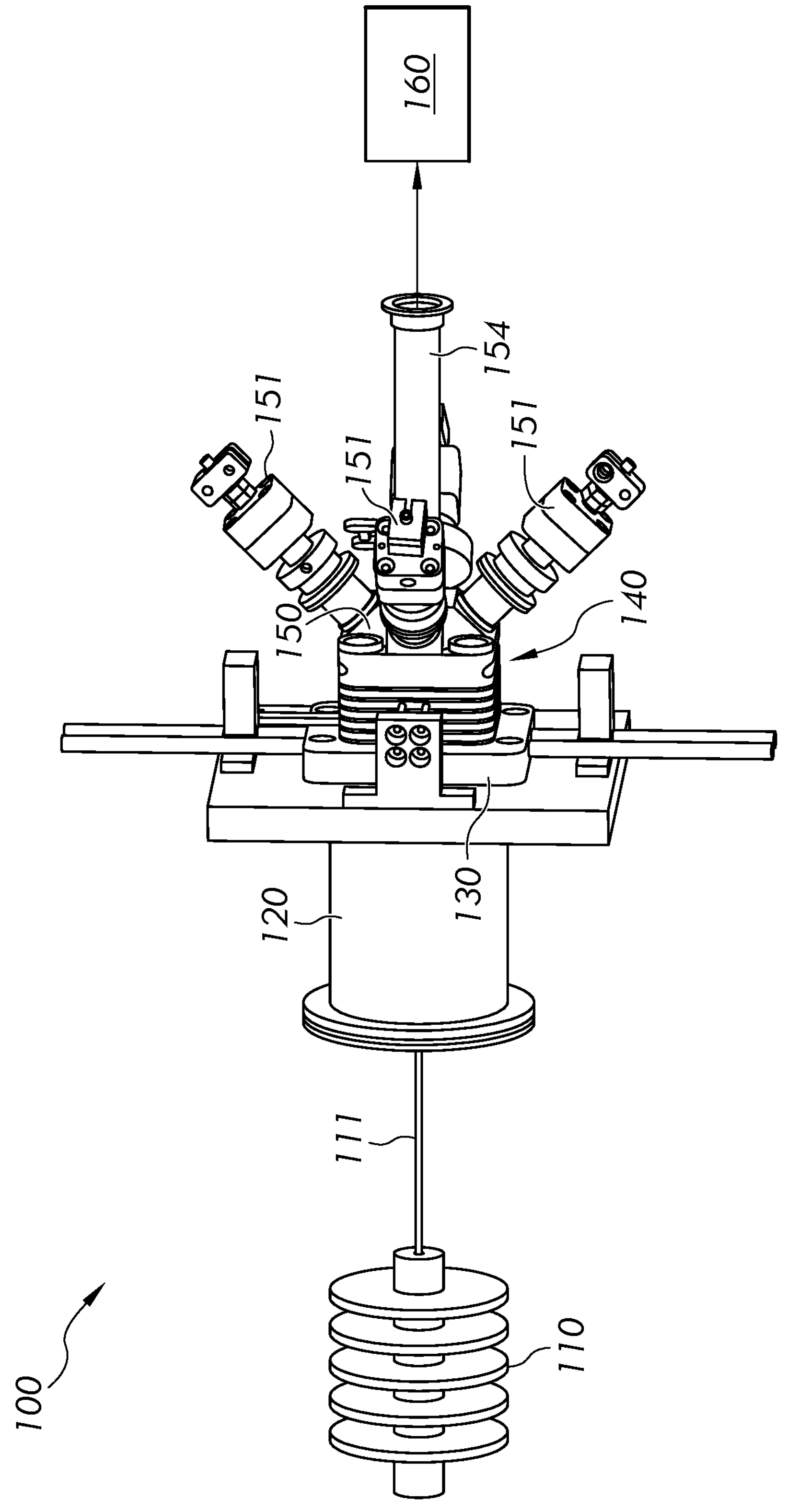
FIG. 1 schematically depicts a gaseous target neutron generation system according to embodiments disclosed and described herein.

Reference will now be made in detail to embodiments of cathode end cooling systems for use in plasma windows of beam accelerator systems, embodiments of which are illustrated in the accompanying drawings. Whenever possible, the same reference numerals will be used throughout the drawings to refer to the same or like parts.

According to embodiments, a plasma window is positioned in a gaseous target neutron generation system to operate as a windowless vacuum barrier to separate a low-pressure beamline and a high-pressure gaseous target chamber. The plasma window allows for systems with an increased gaseous target pressure, a shortened target length, and an increased current delivered to the target (e.g., a target gas present in the target chamber). In view of this, beam accelerator systems built with plasma windows result in an increase of up to two orders of magnitude in accessible neutron flux compared to traditional beam accelerator systems.

With reference to FIG. 1, an embodiment a beam accelerator system 100 comprises an ion accelerator 110 that generates a high-energy ion beam 111 that is directed through a low-pressure chamber 120. The beam accelerator system 100 is operative to produce neutrons via fusion reaction. These neutrons may be used, for example, to perform neutron radiography, generate medical isotopes, perform transmutation of radioisotopes, such as waste radioisotopes generated during the operation of a nuclear fission power plant, and generate fusion power. In embodiments, the low-pressure chamber is operated at a vacuum or near vacuum. An anode 130, is positioned adjacent and fluidly connected to the low-pressure chamber 120 and is separated from a cathode housing block 150 by the plasma window 140. The plasma window 140 is adjacent and fluidly connected to both the anode 130 and the cathode housing block 150. In embodiments, the anode 130 may be an anode plate. The cathode housing block 150 is configured to house a plurality of cathodes 151, which will be described in more detail below. The beam accelerator system 100 also comprises a target chamber 160 for housing a target gas, such as deuterium, tritium, helium, or argon. The target chamber 160 and the cathode housing block 150 are pressurized so that the cathode housing block 150 is on a high-pressure side of the beam accelerator system 100, and the anode 130 is present on a low-pressure side (e.g., vacuum side) of the beam accelerator system 100. Gases generated by the ion accelerator 101 and those present in the low-pressure chamber 120 do not travel past the anode 130 and into the plasma window 140 or cathode housing block 150 because of the pressure differential between the low-pressure side of the beam accelerator system 100 and the high-pressure side of the beam accelerator system 100. It should be understood that FIG. 1 is for illustrative purposes only, and is not drawn to scale. It should be noted that in embodiments, the position of the anode and cathode may be reversed. Without wishing to be bound by theory, it is believed that such embodiments would be beneficial when coupling with a neutron-generating target, e.g., to increase available sample volume in the high flux region.

Traditionally, accelerating ions into a gaseous target chamber (such as target chamber 160) requires large and expensive pumping infrastructure to maintain the low pressure required for the ions to be accelerated from the ion accelerator 110 while maximizing the pressure in the target chamber 160, which is adjacent and fluidly coupled to a cathode target region 153 (shown in FIG. 2B) of the cathode housing block 150 in the embodiment depicted in FIG. 1. The lower limit for the pressure in the target chamber is generally determined by the minimum pressure required to stop the incident ion beam. The length of the target chamber 160 may influence the lower pressure limit. In embodiments, the lower limit for the pressure of the target chamber 160 may be 1 torr, 5 torr, 10 torr, 15 torr, 20 torr, 30 torr, 50 torr, 100 torr, or 500 torr. The upper limit for the pressure of the target chamber 160 is generally controlled by the ability of the pumping system to maintain the required pressure differential. Larger ion beam sizes and higher current ion beams require more pumping due to the conductance of the ion beam through a channel of the plasma window and into the target. Therefore, the beam size and thus total yield of a system is limited by the diameter of the channel into the target chamber.

Utilizing a plasma window 140 between the anode 130, which is at low pressure (e.g., near vacuum), and the cathode housing block 150, which is at high pressure, allows for a greater pressure reduction factor relative to traditional channels, facilitating the use of larger diameter and higher power ion beams. The gains from pressure reduction also reduce the total pumping cost due to the decrease in conductance and pumping hardware required to maintain the pressure differential.

Figure 2B:
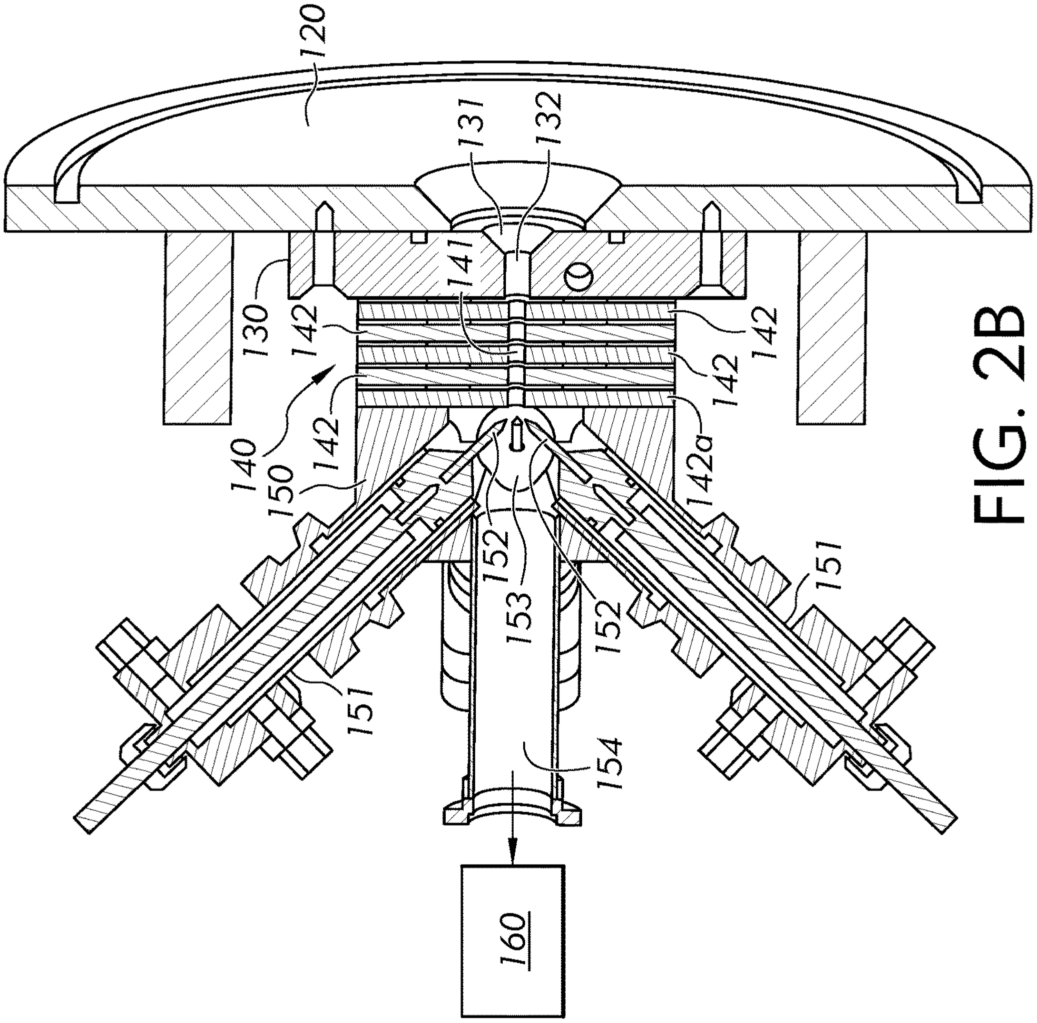
FIG. 2B schematically depicts a cross-section of a low pressure chamber, anode, plasma window, cathode housing block, and cathodes according to embodiments disclosed and described herein.
Figure 2A:
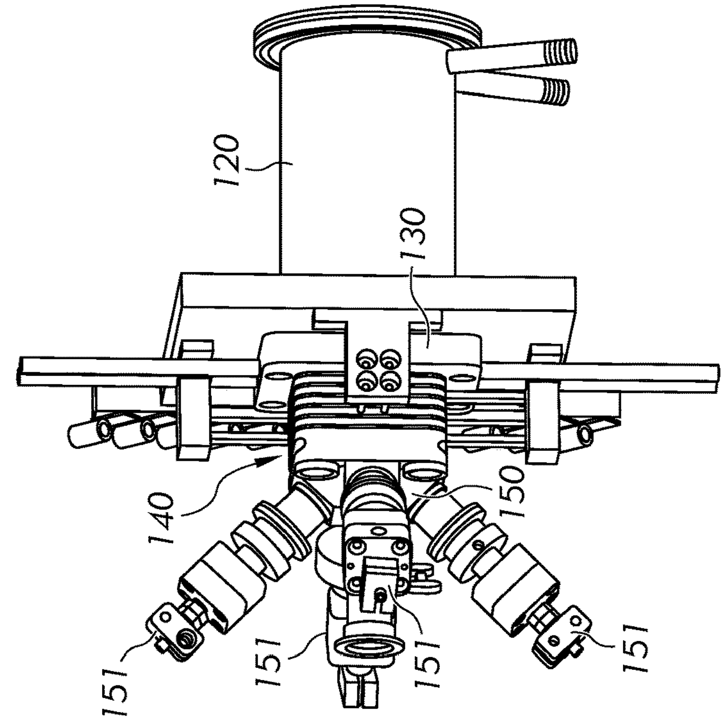
FIG. 2A schematically depicts a low pressure chamber, anode, plasma window, cathode housing block, and cathodes according to embodiments disclosed and described herein.

FIG. 2A is a side view of the low-pressure chamber 120, the anode 130, the plasma window 140, the cathode housing block 150, and the cathodes 151. As shown in FIG. 2A, the plasma window 140 comprises a plurality of plates that are adjacent and connected to one another. In embodiments, the plasma window 140 comprises from 4 to 8 plates, such as from 5 to 7 plates, or 6 plates. As noted above, the plasma window 140 is positioned between the anode 130 and the cathode housing block 150, and the plasma window 140 is connected to both the anode 130 and the cathode housing block 150. The cathode housing block 150 is configured to support a plurality of cathodes 151. In embodiments, the cathode housing block 150 is configured to support four cathodes, three cathodes, or two cathodes. In embodiments where the cathode housing block is configured to support four cathodes, the cathodes 151 may be positioned about 90° from one another in the cathode housing block 150. In embodiments where the cathode housing block 150 is configured to support three cathodes, the cathodes 151 may be positioned about 120° from one another, and in embodiments where the cathode housing block 150 is configured to support two cathodes, the cathodes 151 may be positioned about 180° from one another.

FIG. 2B is a cross-section view of the low-pressure chamber 120, the anode 130, the plasma window 140, and the cathode housing block 150 depicted in FIG. 2A. The anode 130 is, in embodiments, a grounded plate that comprises a nozzle 131 that is fluidly connected to the low-pressure chamber 120. The nozzle 131 is also fluidly connected to a channel 132 positioned in the anode 130. As will be discussed in more detail below, the nozzle 131 and the channel 132 in the anode 130 operate to funnel the ion beam from the low-pressure side of the beam accelerator system 100 to the plasma window 140. To this end, in one or more embodiments, the anode 130 and/or the low-pressure chamber 120 are mounted to and fluidly connected with a pumping system.

With reference still to FIG. 2B, the plasma window 140 includes five adjacent plates 142 that are connected to one another and separate the anode 130 from the cathode housing block 150. The plate most proximate to the cathode housing block 150 is hereinafter referred to as a cathode end cooling plate 142*a*. It should be understood that embodiments of the plasma window 140 may comprise more or less than five plates 142. Each plate 142 of the plasma window 140 comprises a circular aperture 410 (shown in FIG. 3) at or near the geometrical center of the plate 142. The circular aperture of each plate 142 is aligned around a central axis 141*a* (shown in FIG. 4) so that when the plurality of plates 142 are aligned and connected, the coaxial, circular apertures in the plates 142 form a plasma channel 141 through which the high-energy ion beam will travel, from the anode 130 to the cathode housing block 150. However, it should be appreciated that in embodiments the apertures in the plates 142 need not be perfectly circular and may be any shape that can accommodate the transmission of the high-energy ion beam. The plates 142 of the plasma window 140 are, in embodiments, electrically floating and may be cooled with a fluid, such as water. By constructing the plates 142 to be electrically floating, the voltage gradient across the plasma channel 141 is not as steep as it would be if the plates 142 were grounded; this can aid the transmission of the high-energy ion beam across the plasma channel 141. In one or more embodiments, separators may be positioned between portions of adjacent plates 142 as well as between the cathode housing block 150 and the cathode end cooling plate 142*a*. In embodiments, the separators may comprise an inner spacer 145 most proximate to the plasma channel 141 (e.g., a boron nitride spacer), an O-ring 143 surrounding the inner spacer 145 (e.g., a Viton O-ring), and outer spacer 147 surrounding the O-ring 143, e.g., a PVC or PEEK spacer (see FIG. 4). In order to provide longer lifetimes in high neutron environments, brazed or diffusion bonded metal-to-metal seals may also be used as an alternative to O-rings.

While not depicted in some of the figures (e.g., FIG. 3), the diameter of the aperture 410 in each plate 142 is approximately the size of the ion beam that is transmitted through the plasma channel 141. In embodiments, the plasma window 140 to may have a fixed aperture size. In embodiments, the plasma window 140 may have a variable aperture size that could be adjusted to more closely match the properties of the ion beam. The diameter of the high-energy ion beams (and in some cases, high-energy electron beams) generated in beam accelerator systems are orders of magnitude larger than the sub one-millimeter diameter of electron beams used in typical, low power electron beam (e-beam) systems. Accordingly, much smaller aperture diameters can be used in typical e-beam and low-energy, precision ion beam systems than in beam accelerator systems that generate high-energy ion beams. Further, the larger the aperture diameters used, the more total power is required to fill the plasma channel 141 with plasma 310, which may comprise a plasma, (discussed in more detail below). Thus, more heat is delivered to the aperture walls and the cathode housing block 150 in beam accelerator systems involving high-energy ion beams, and in some cases, high-energy electron beams. Accordingly, the cathode housing block 150 and plates 142 used in plasma windows of high-energy ion beam accelerator systems have entirely different cooling requirements than components used in conventional e-beam systems and low-energy, precision ion beam systems.

Still referring to FIG. 2B, the cathode housing block 150 is configured to support a plurality of cathodes 151, as described above. The cathode housing block 150 comprises a cathode target region 153 that is fluidly coupled to the target chamber 160 and in which the target gas housed in the target chamber 160 is also present. Each cathode 151 comprises a cathode needle 152 that extends from the cathode 151 into the cathode target region 153. The cathodes 151 apply a voltage (e.g., a voltage in a range of from 150 V to 250 V, such as 200 V) across multiple points in the cathode target region 153 via the cathode needles 152 to initiate and/or maintain the heating and ionization of a portion of the target gas, thereby forming the plasma 310. In some embodiments, the cathodes 151 apply voltage to both initiate the formation of and maintain the plasma 310. However, other methods of initiating formation of the plasma 310 are contemplated, such as using one or more initiation coils, such as tesla coils, to apply the initial voltage. Such initiation coils, while not depicted, may be mounted on one or more of the plates 142 of the plasma window 140. Moreover, in embodiments comprising initiation coils, the cathodes 151 may still apply a voltage to maintain the plasma 310. The cathode target region 153 of the cathode housing block 150 is fluidly coupled to the target chamber 160 by a gas inlet 154, and both the target chamber 160 and the cathode target region 153 operate at a significantly higher pressure than the anode 130 and the low-pressure chamber 120. The target chamber 160 and the cathode target region 153 may be pressurized by a pumping system or the like. It should be understood that, in some embodiments, the cathode target region 153 is a portion of the target chamber 160, that is, the portion of the target chamber 160 nearest the cathode needles 152.

Figure 3:
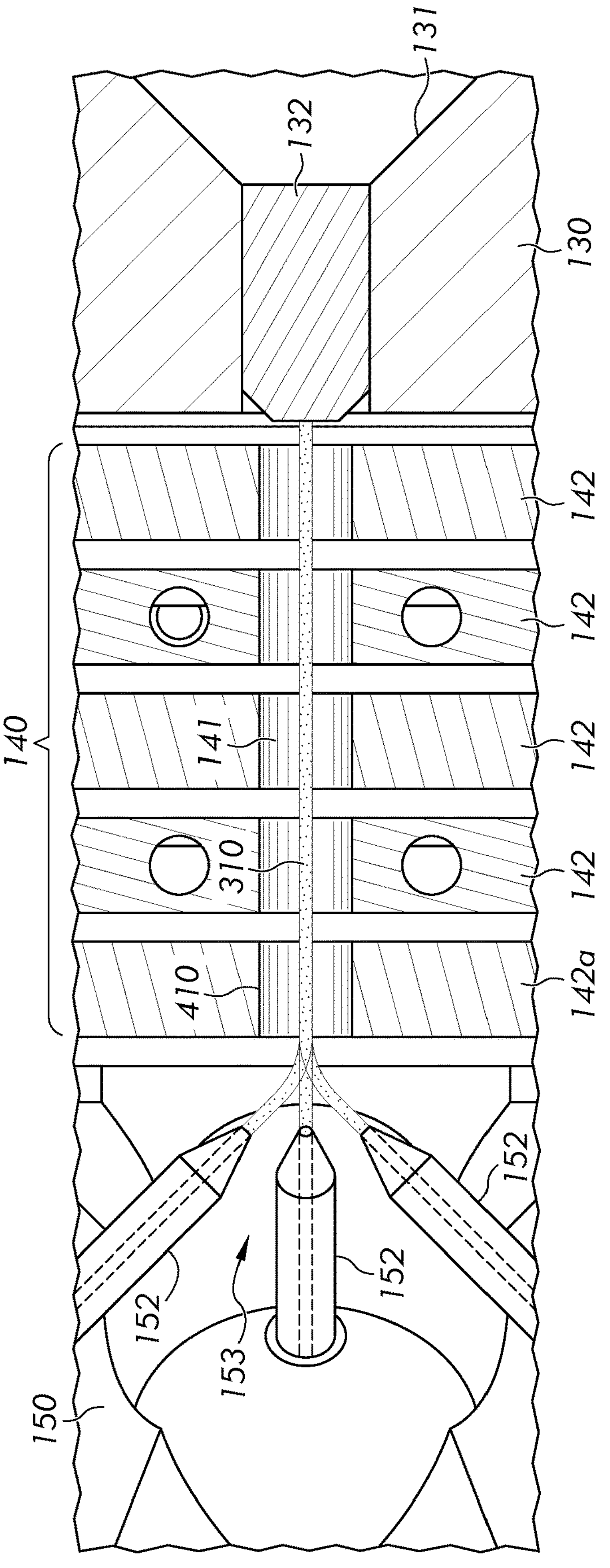
FIG. 3 schematically depicts a cross-section of an anode, plasma window, and cathode housing block according to embodiments disclosed and described herein.

The transmission of the high-energy ion beam from the ion accelerator through the plasma window 140 to the cathode target region 153 of the cathode housing block 150 will now be described with reference to FIG. 3, which is a cross-section view of the anode 130, the plasma window 140, and the cathode housing block 150. As mentioned above, the anode 130 may, in embodiments, be an anode plate comprising a nozzle 131 that is fluidly connected to the low-pressure chamber 120 (not shown in FIG. 3) and a channel 132 fluidly connected to the nozzle 131. The plasma window 140 depicted in FIG. 3 includes five adjacent plates 142 (one being the cathode end cooling plate 142*a*) having circular apertures coaxially aligned to form plasma channel 141. The plasma channel 141 is fluidly connected to the channel 132 of the anode 130 and the cathode target region 153 of the cathode housing block 150. Target gas is introduced into the cathode target region 153 and a plasma 310 is generated at the cathode needles 152 (or at one or more initiation coils), and the plasma 310 fills the plasma channel 141 and extends into the channel 132 in the anode 130. By filling the plasma channel 141 with the plasma 310, a pressure barrier is created between the cathode housing block 150 and the anode 130. However, the ion beam from the ion accelerator (shown in FIG. 1) is capable passing through the plasma 310. Therefore, the pressure differential between the high-pressure side of the beam accelerator system 100 and the low-pressure side of the beam accelerator system 100 can be maintained while still transmitting a high-energy ion beam through the beam accelerator system 100.

As described above, the plasma window 140 disclosed and described herein is effective at maintaining pressure differentials in the beam accelerator system 100, which can significantly reduce the costs (both capital and operating) and footprint associated with pumping systems needed in the beam accelerator system 100 that do not utilize one or more plasma windows 140. However, cooling a plasma window 140 and the cathode housing block 150 once the plasma channel 141 fills with the plasma 310 is a challenge. In particular, it is conventional to use a constant power density on the plasma channel 141 regardless of the diameter of the plasma channel 141. However, as the diameter of the plasma channel 141 increases, the total power applied to the wall of the plasma channel 141 increases, causing extremely high temperatures. Portions of the plasma 310 that fill the plasma channel 141 may contact the inner wall of the apertures 410 as well as the inner wall of the opening of the cathode housing block 150. This can lead to significant heat loads in the plates 142 and the cathode housing block 150, especially around the apertures 410 of the plates 142 and the opening of the cathode housing block 150. Thermally conductive metals traditionally used in industry, such as copper, may not be able to withstand the temperatures in contact with—or even in close proximity to—the plasma 310.

With regards to the cathode housing block 150 in particular, failing to implement an adequate cooling solution may compromise the integrity of the O-ring 143 (shown in FIG. 4) positioned between the cathode housing block 150 and the cathode end cooling plate 142*a*. Inadequate cooling of the cathode housing block 150 may lead to failure of the O-ring 143 between the cathode housing block and the cathode end cooling plate 142*a*, which could lead to, for example, hot hydrogen plasma hitting the atmosphere. While the cathode housing block 150 may include one or more cooling grooves 159, which increase the surface area of the cathode housing block 150 that is cooled by the surrounding air, additional cooling is desired approximate to the O-ring 143. The present disclosure provides embodiments for cathode end cooling systems that achieve good cooling of the cathode housing block 150.

Figure 4:
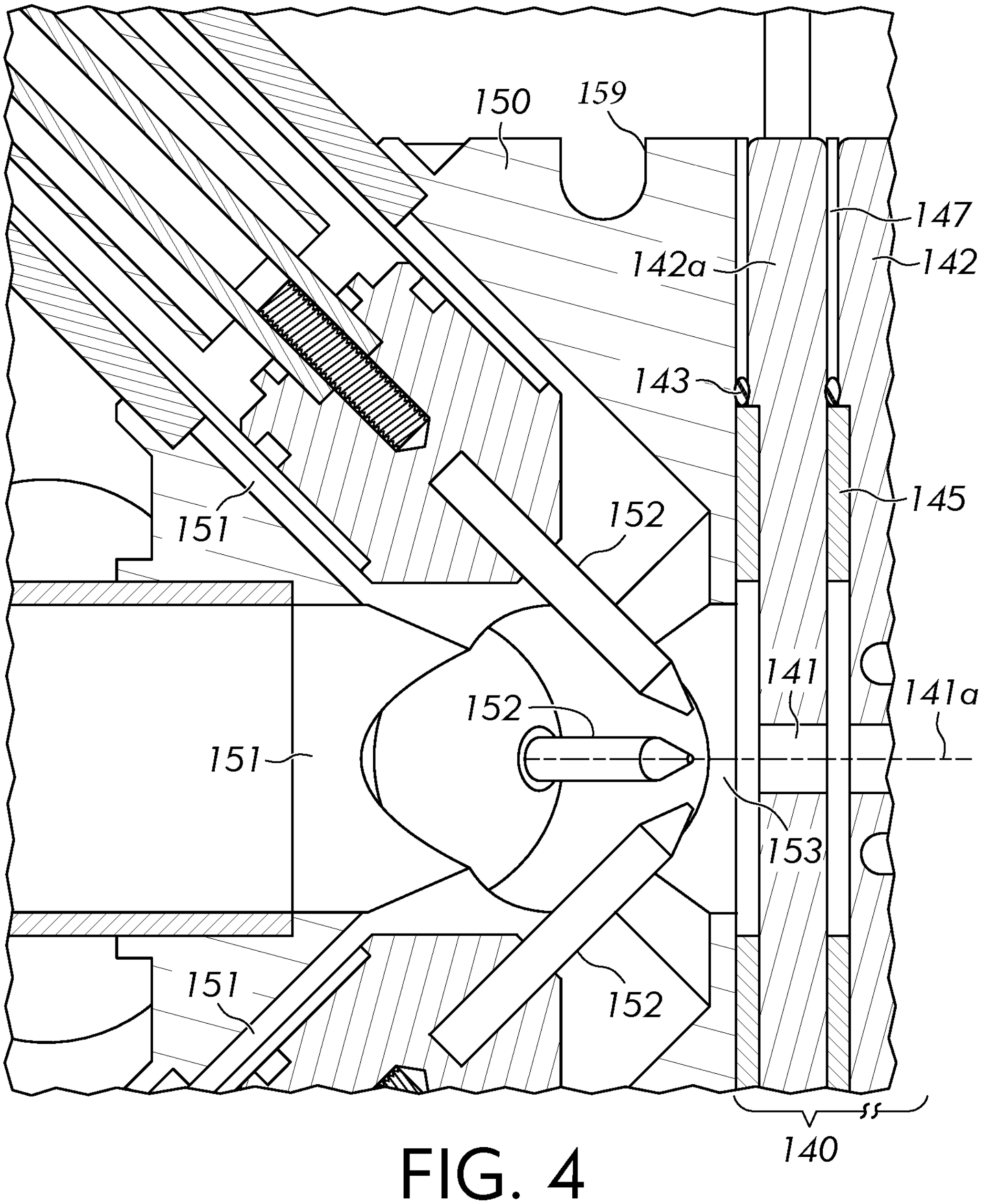
FIG. 4 schematically depicts a cross-section of the cathode housing block facing a cathode end cooling plate according to embodiments disclosed and described herein.

FIG. 4 is a cross-section view of a cathode housing block 150 and the cathode side of the plasma window 140, including the cathode end cooling plate 142*a*. An O-ring 143 is positioned between the cathode housing block 150 and the cathode end cooling plate 142*a*. As discussed above, inadequate cooling of the cathode housing block 150 may cause the O-ring 143 to fail. To facilitate discussion of cathode end cooling systems described below, FIG. 4 also introduces a longitudinal axis 141*a* of the plasma channel 141.

Figure 5:
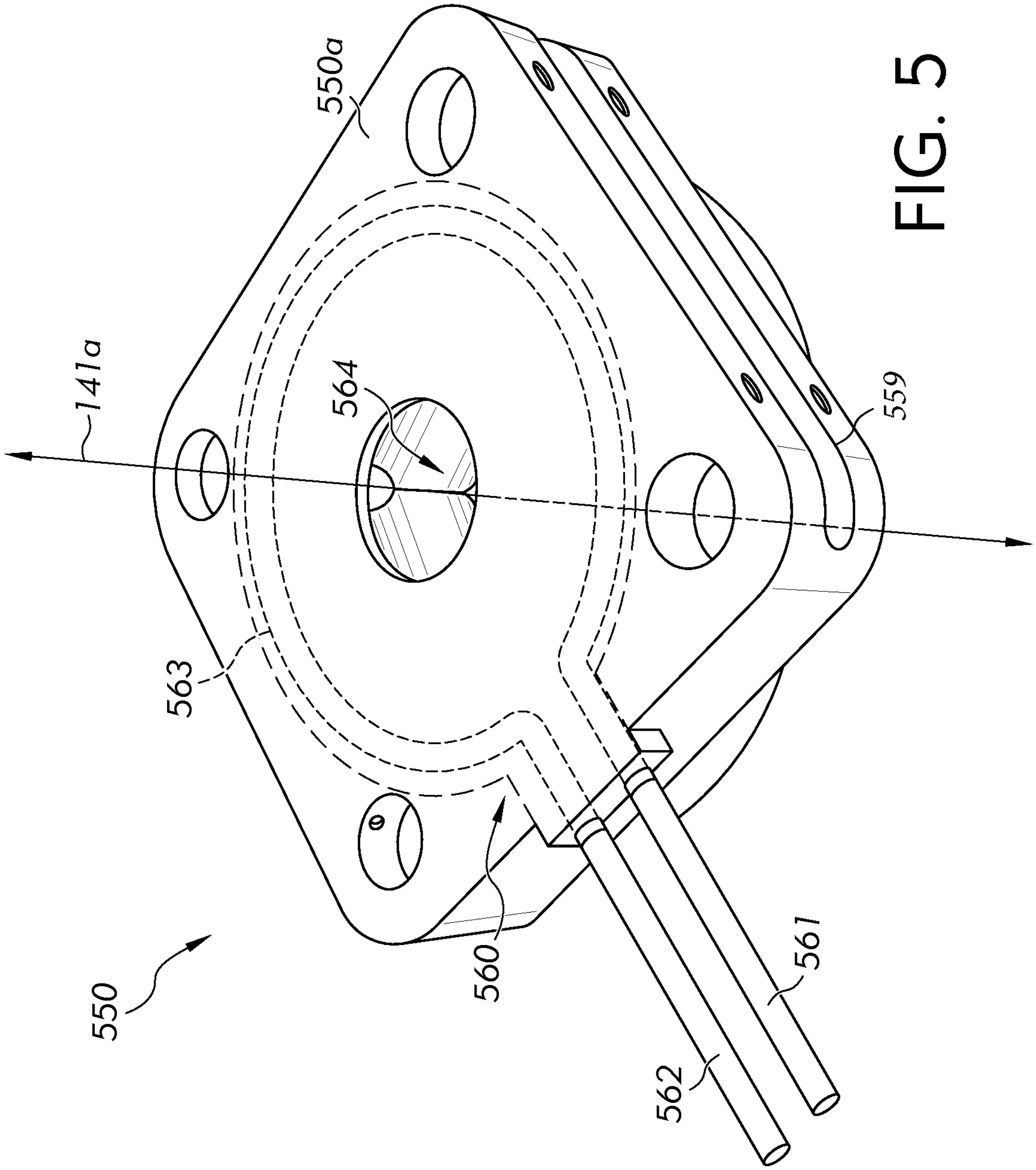
FIG. 5 schematically depicts a cathode housing block of a cathode end cooling system according to embodiments disclosed and described herein.

FIG. 5 is a perspective view of a cathode housing block 550 of a cathode end cooling system according to the present disclosure wherein the cathode housing block 550 comprises a cooling portion 560. The cooling portion 560 comprises a fluid inlet 561, a fluid outlet 562, a cooling channel 563 positioned within the cooling portion 560 and fluidly coupling the fluid inlet 561 and the fluid outlet 562, and an opening 564 positioned (after installation) adjacent to the plasma window 140 and aligned with the longitudinal axis 141*a* of the plasma channel 141. As shown in FIG. 5, the cooling portion 560 may be defined as a disc-shaped region of the cathode housing block 550 that extends radially from the opening 564 to the cooling channel 563 (and in embodiments comprising multiple cooling channels, to the radially outermost cooling channel). In embodiments, the cooling portion 560 extends radially beyond the cooling channel 563 by up to one, up to two, or up to three cooling channel diameters (diameter of the bore forming the cooling channel). In embodiments, the cooling portion 560 extends from the plasma facing surface 550*a* of the cathode housing block 550, in a direction normal to a plane defining the plasma facing surface 550*a*, into the cathode housing block 550 to a depth equal to twice the diameter of the cooling channel 563. In embodiments, the cooling portion 560 extends from a plasma facing surface 550*a* of the cathode housing block 550, in a direction normal to the plane defining the plasma facing surface 550*a*, into the cathode housing block 550 to a depth equal to three times the diameter of the cooling channel 563.

Figure 6:
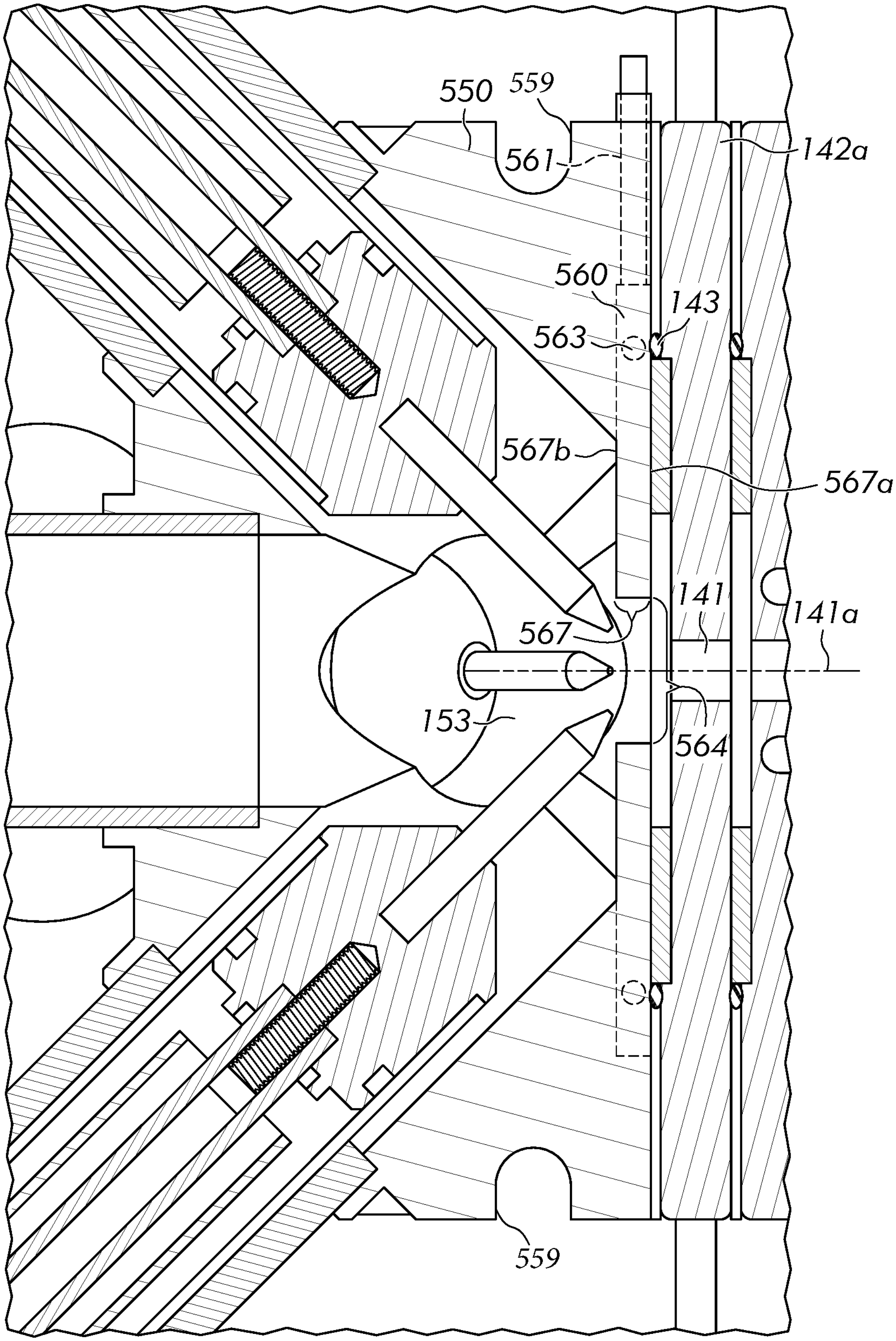
FIG. 6 schematically depicts a cross-section of the cathode housing block shown in FIG. 5.

FIG. 6 is a cross-section view of the cathode housing block 550 shown in FIG. 5. As shown, the opening 564 of the cooling portion 560 is aligned with the longitudinal axis 141*a* of the plasma channel 141. In the embodiment shown in FIGS. 5-6, the cooling portion 560 defines a wall 567 of the cathode target region 153. Accordingly, the wall 567 defined by the cooling portion 560 comprises a first side 567*a* and a second side 567*b* opposite the first side 560*a*. The first side 567*a* faces toward the cathode end cooling plate 142*a*, and the second side 567*b* faces toward the cathode target region 153. In embodiments, the first side 567*a* may define a plane that is substantially parallel to a plane defined by the second side 567*b*, as shown in FIG. 6.

In embodiments, the cooling channel 563 may be positioned in the cooling portion 560 adjacent to the O-ring 143 separating the cathode housing block 550 from the cathode end cooling plate 142*a*. In embodiments where the cooling channel 563 is positioned adjacent to the O-ring 143, the cooling channel 563 may be positioned directly adjacent to the O-ring 143, e.g., such that the cooling channel 563 extends within the cooling portion 560 at a radial distance from the longitudinal axis 141*a* that is equal to a radius Ro of the O-ring 143 (see FIG. 7), or approximately adjacent to the O-ring 143, e.g., so as to be positioned within a radial distance of one, two, or three cooling channel diameters from the O-ring 143. By positioning the cooling channel 563 adjacent to the O-ring 143, the cooling portion 560 is able to provide cooling to the O-ring 143 and may prevent potential failure of the O-ring 143 due to heat conductance from the plasma channel 141. However, as discussed below in alternative embodiments, the cooling channel within the cathode housing block need not be positioned adjacent to the O-ring 143.

In embodiments, the cooling channel 563 may be adjacent to the O-ring 143 over the entire central axis of the O-ring 143 encircling the longitudinal axis 141*a*. In other embodiments, the cooling channel 563 may be adjacent to the O-ring 143 over a portion of the central axis of the O-ring 143. For example, the cooling channel 563 may be adjacent to the O-ring 143 over the entire central axis of the O-ring 143 except in a region where the fluid inlet 561 and fluid outlet 562 are fluidly coupled to the cooling channel 563.

The cathode target region 153 comprises a maximum cross-sectional area normal to the longitudinal axis 141*a* of the plasma channel 141. Likewise, the opening 564 of the cooling portion 560 comprises a cross-sectional area normal to the longitudinal axis 141*a* of the plasma channel 141. In embodiments, the maximum cross-sectional area of the cathode target region 153 is larger than the cross-sectional area of the opening 564 of the cooling portion 560. In some embodiments, the cathode housing block 550 includes one or more cooling grooves 559.

Figure 7:
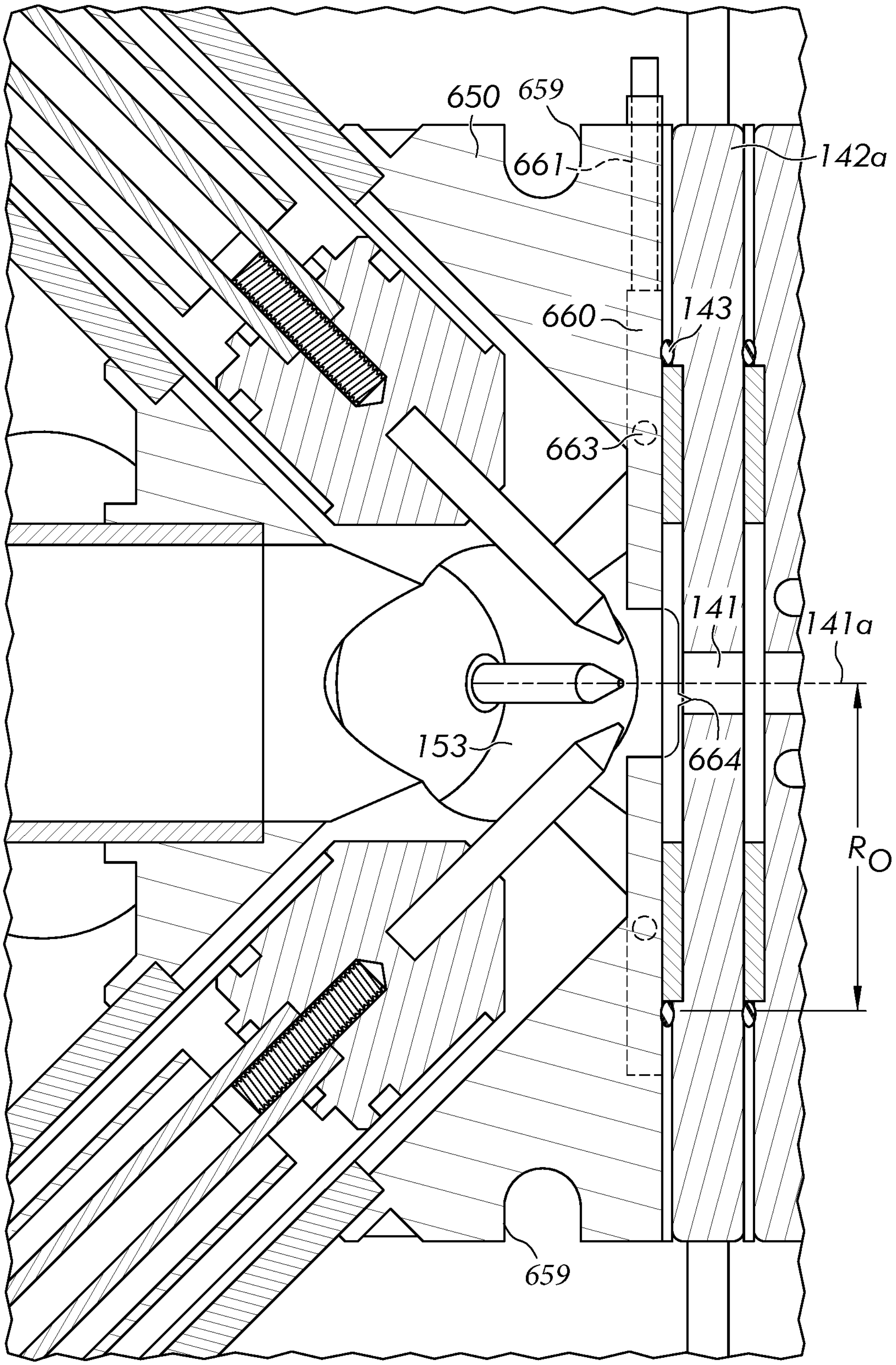
FIG. 7 schematically depicts a cross-section of a second embodiment of a cathode housing block disclosed and described herein.

FIG. 7 is a cross-section view of the cathode housing block 650 according to another embodiment of a cathode end cooling system. Like the cathode housing block 550, the cathode housing block 650 comprises a cooling groove 659 and a cooling portion 660. The cooling portion 660 comprises a fluid inlet 661, a fluid outlet (not shown in FIG. 7), a cooling channel 663 positioned within the cooling portion 660 and fluidly coupling the fluid inlet 661 and the fluid outlet, and an opening 664 positioned adjacent to the plasma window 140 and aligned with the longitudinal axis 141*a* of the plasma channel 141. However, the cathode housing block 650 differs from the cathode housing block 550 in that the cooling channel 663 extends within the cooling portion 660 at a radial distance from the longitudinal axis 141*a* that is less than the radius Ro of the O-ring 143, such that the cooling channel 663 is positioned radially inward from the O-ring 143. In embodiments, the cooling channel 663 being positioned radially inward from the O-ring 143 may correspond with cooling channel 663 being positioned radially inwards at a distance of least one, at least two, or at least three cooling channel diameters from the O-ring 143. Accordingly, in the embodiment shown in FIG. 7, the cooling channel 663 provides cooling to the cathode housing block 650 in the path of heat conductance from the plasma channel 141 to the O-ring 143.

In embodiments, the cooling channel 663 may be radially inward from the O-ring 143 over the entire central axis of the O-ring 143 encircling the longitudinal axis 141*a*. In other embodiments, the cooling channel 663 may be radially inward from the O-ring 143 over a portion of the central axis of the O-ring 143. For example, the cooling channel 663 may be radially inward from the O-ring 143 over the entire central axis of the O-ring 143 except in a region where the fluid inlet 661 and fluid outlet (not shown) are fluidly coupled to the cooling channel 663.

Figure 8:
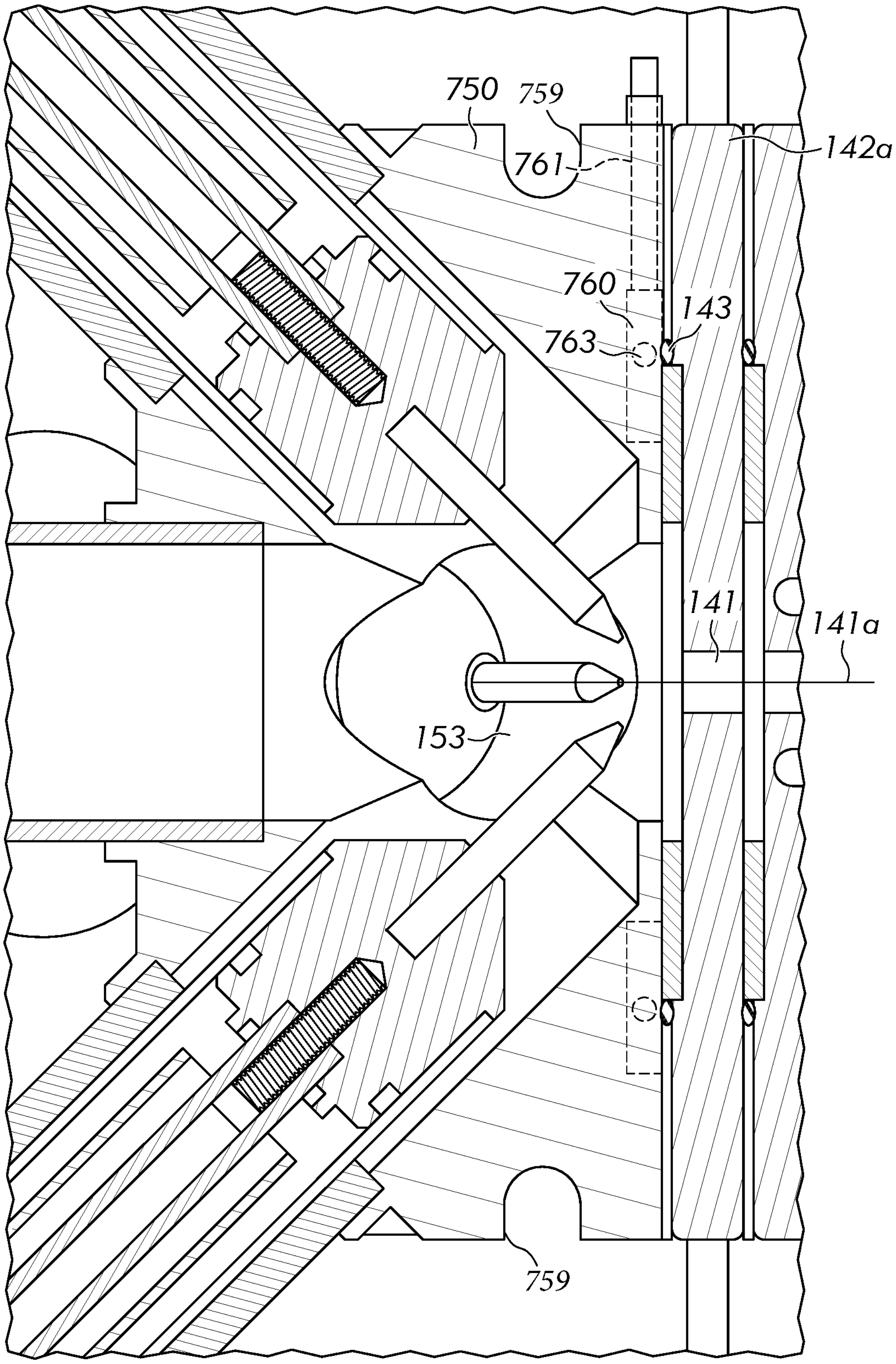
FIG. 8 schematically depicts a cross-section of a third embodiment of a cathode housing block disclosed and described herein.

In at least one embodiment, the cooling portion of the cathode housing block does not define a wall of the cathode target region 153, as shown in FIG. 8. The cooling portion 760 of the cathode housing block 750 includes a fluid inlet 761, a fluid outlet (not shown in FIG. 8), and a cooling channel 763 within the cooling portion 760 and fluidly coupling the fluid inlet 761 and the fluid outlet. However, as shown in FIG. 8, the cooling portion 760 does not extend radially inwards so as to define a wall of the cathode target region. Moreover, while the cooling channel 763 is shown adjacent to the O-ring 143, the cooling channel 763 could also be located at a radial distance from the longitudinal axis 141*a* that is less than or greater than the radius $R_O$ of the O-ring 143.

Figure 9:
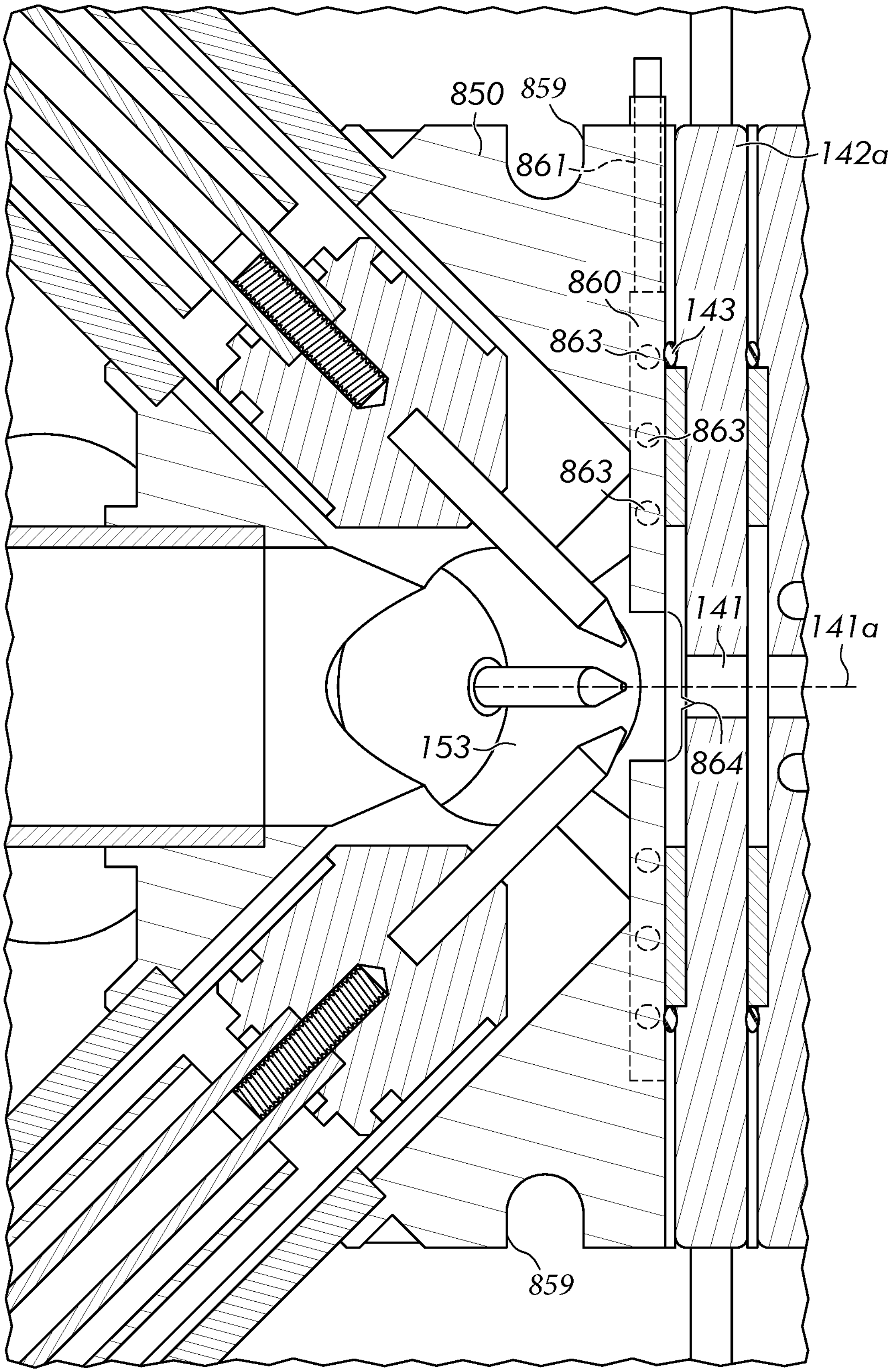
FIG. 9 schematically depicts a cross-section of a fourth embodiment of a cathode housing block disclosed and described herein.

FIG. 9 is a cross-section view of a cathode housing block 850 according to another embodiment of a cathode end cooling system. Like the cathode housing block 550, the cathode housing block 850 comprises a cooling groove 859 and a cooling portion 860. The cooling portion 860 comprises a fluid inlet 861, a fluid outlet (not shown in FIG. 9), a cooling channel 863 positioned within the cooling portion 860 and fluidly coupling the fluid inlet 861 and the fluid outlet, and an opening 864 positioned adjacent to the plasma window 140 and aligned with the longitudinal axis 141*a* of the plasma channel 141. However, in the cathode housing block 850, the cooling channel 863 extends within the cooling portion 860 in substantially concentric rings around the longitudinal axis 141*a* of the plasma channel 141. Without being bound by theory, it is believed this such a cooling channel design may permit increased cooling to the cathode housing block 850.

The cooling channel in any of the above embodiments of cooling portions of cathode housing blocks may have respective fluid inlets and fluid outlets that are positioned on the same side of the cooling portion. Alternatively, the fluid inlet and fluid outlet may be positioned on different sides of the cooling portion.

In the above four embodiments of cathode housing blocks, i.e., cathode housing blocks 550, 650, 750, and 850, the respective cooling portions may be unitary with the rest of the cathode housing block. That is to say, the cooling channel of the cooling portions 560, 660, 760, and 860 may be machined directly into the cathode housing block by drilling, laser or water beam ablation, or the like. However, the cathode housing block may also be formed using a mold or with 3D printing such that the cooling channel do not need to be separately machined into the cathode housing block. In embodiments, the cathode housing block is unitary without seams or welding artifacts. Seams and welding artifacts can act as a weak points in plasma window components and may fail when exposed to high temperatures.

Figure 10:
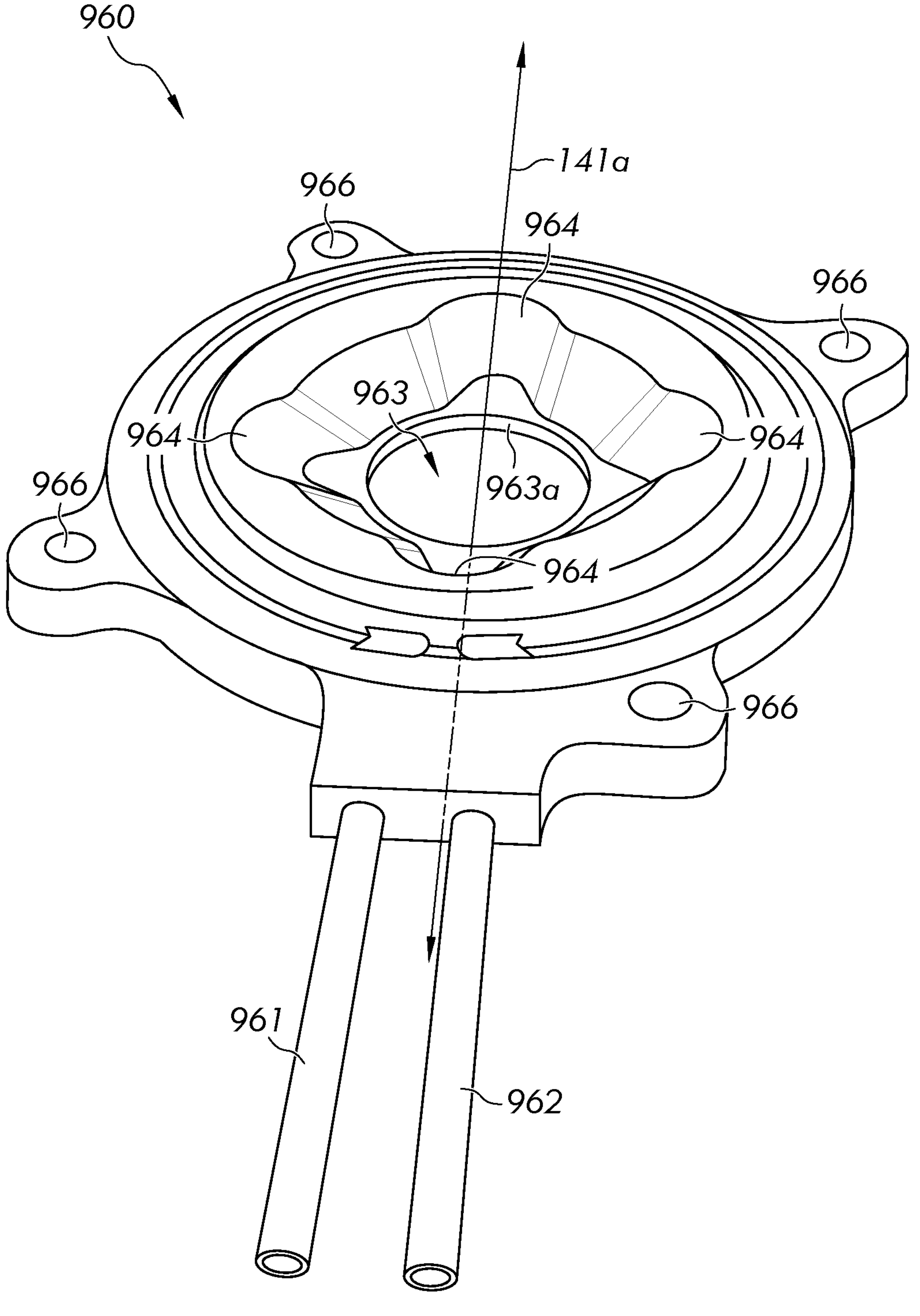
FIG. 10 schematically depicts a fluid cooled insert according to embodiments disclosed and described herein.

In embodiments, the cooling portion comprises a fluid cooled insert. FIG. 10 is a perspective view of a fluid cooled insert 960 that may be positioned between a cathode housing block 950 and the plurality of cooling plates 142 of the plasma window 140. In particular, the fluid cooled insert 960 is positioned between the cathode end cooling plate 142*a* and a plasma facing end 950*a* (shown in FIG. 12*a*) of the cathode housing block 950. FIG. 10 shows the side of the fluid cooling insert 960 that faces the cathode housing block 950 when installed. The fluid cooled insert 960 comprises a fluid inlet 961, a fluid outlet 962, a cooling channel (not shown in FIG. 10) within the fluid cooled insert 960 and fluidly coupling the fluid inlet 961 and fluid outlet 962, and an opening 963 that aligns with the longitudinal axis 141*a* of the plasma channel 141 when the fluid cooled insert 960 is installed. In embodiments, the fluid inlet 961 and fluid outlet 962 are positioned on the same side of the fluid cooled insert 960.

Figure 11:
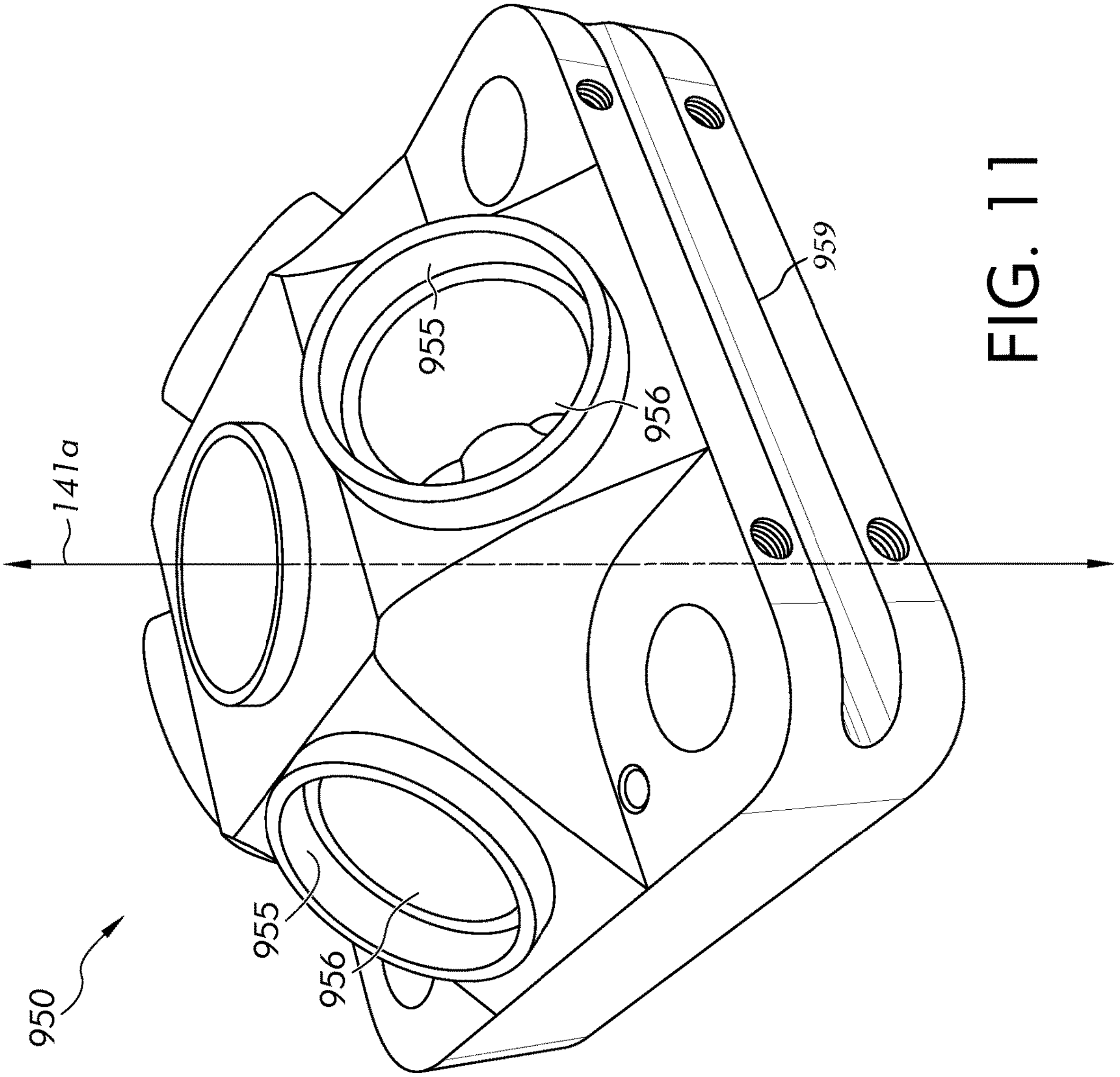
FIG. 11 schematically depicts a cathode housing block according to embodiments disclosed and described herein.

FIG. 11 is a perspective view of the cathode housing block 950 according to embodiments of the present disclosure. The cathode housing block 950 shown in FIG. 11 is configured to support four cathodes 151 (not shown in FIG. 11) that are angularly separated from one another by 90° with respect to the longitudinal axis 141*a* of the plasma channel 141, and angularly spaced from a plane normal to the longitudinal axis 141*a* by about 45°. It should be understood that the angular spacing between the cathodes 151 and the plane normal to the longitudinal axis 141*a* may be modified so long as the tips of the cathode needles 152 are able to effectively discharge current to generate the plasma 310 of the plasma window 140. Each cathode 151 may be supported in part by a mounting surface 955 of the cathode housing block 950. Further, each cathode 151 may extend through a cathode holder 956. Each cathode holder 956 may be in the form of a cylindrically-shaped bore and may provide support to a cathode 151. The longitudinal axis 141*a* of the plasma channel 141 has been superimposed in FIG. 11 to show its location relative to the cathode holders 956 when the beam accelerator system setup has been completed. The shape of the cathode holder 956 and mounting surface 955 may be modified depending on the shape of the cathode to be implemented. Cathode housing blocks 550, 650, 750, and 850 may be configured in a similar manner to support cathodes 151. In some embodiments, the cathode housing block 950 includes one or more cooling grooves 959. Referring back to FIG. 10, the fluid cooled insert 960 may comprise cathode receiving surfaces 964 that, in conjunction with cathode holders 956, allow for cathodes to be mounted to the cathode housing block 950 in a secure manner.

Figure 12A:
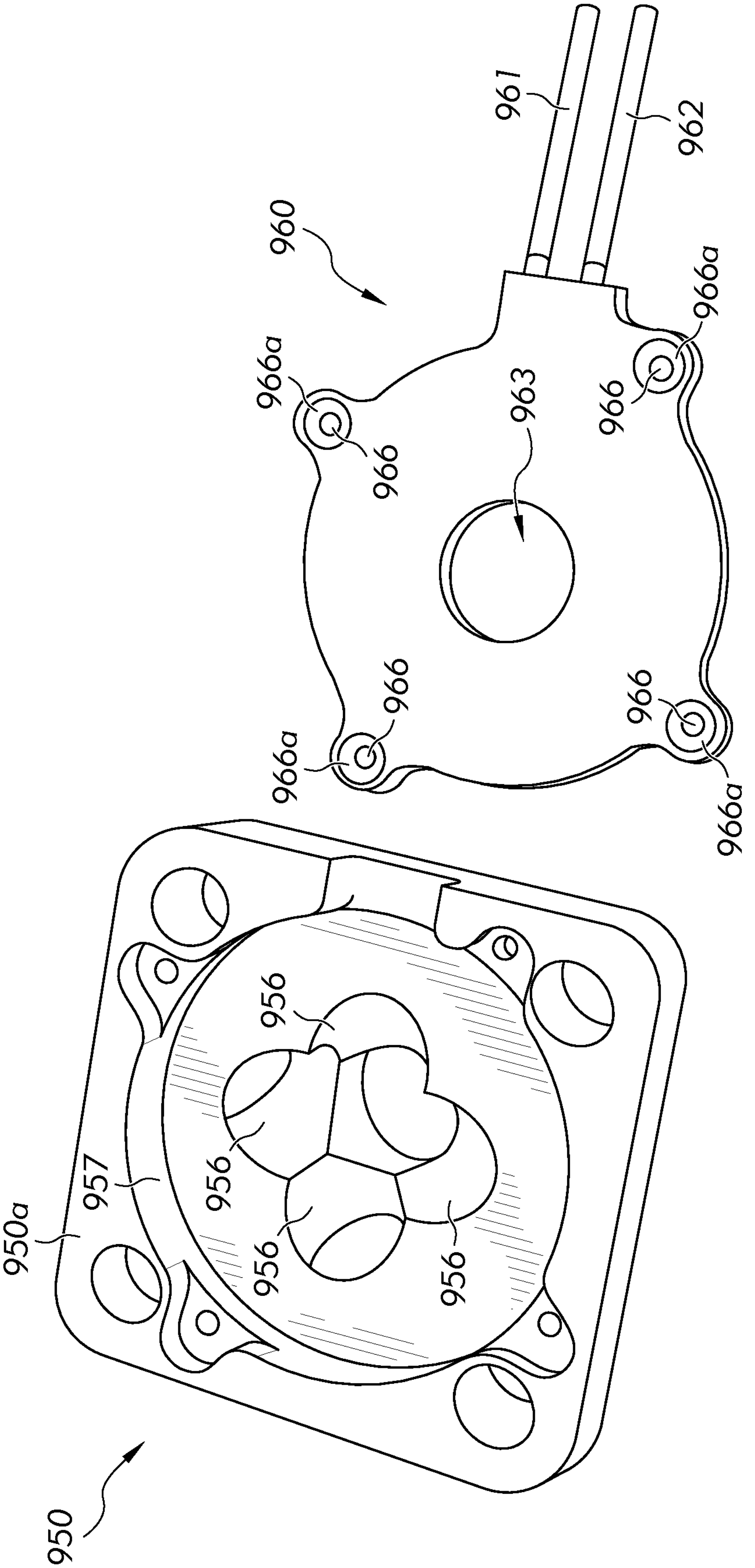
FIG. 12A schematically depicts the cathode housing block and a corresponding fluid cooled insert according to embodiments disclosed and described herein.
Figure 12B:
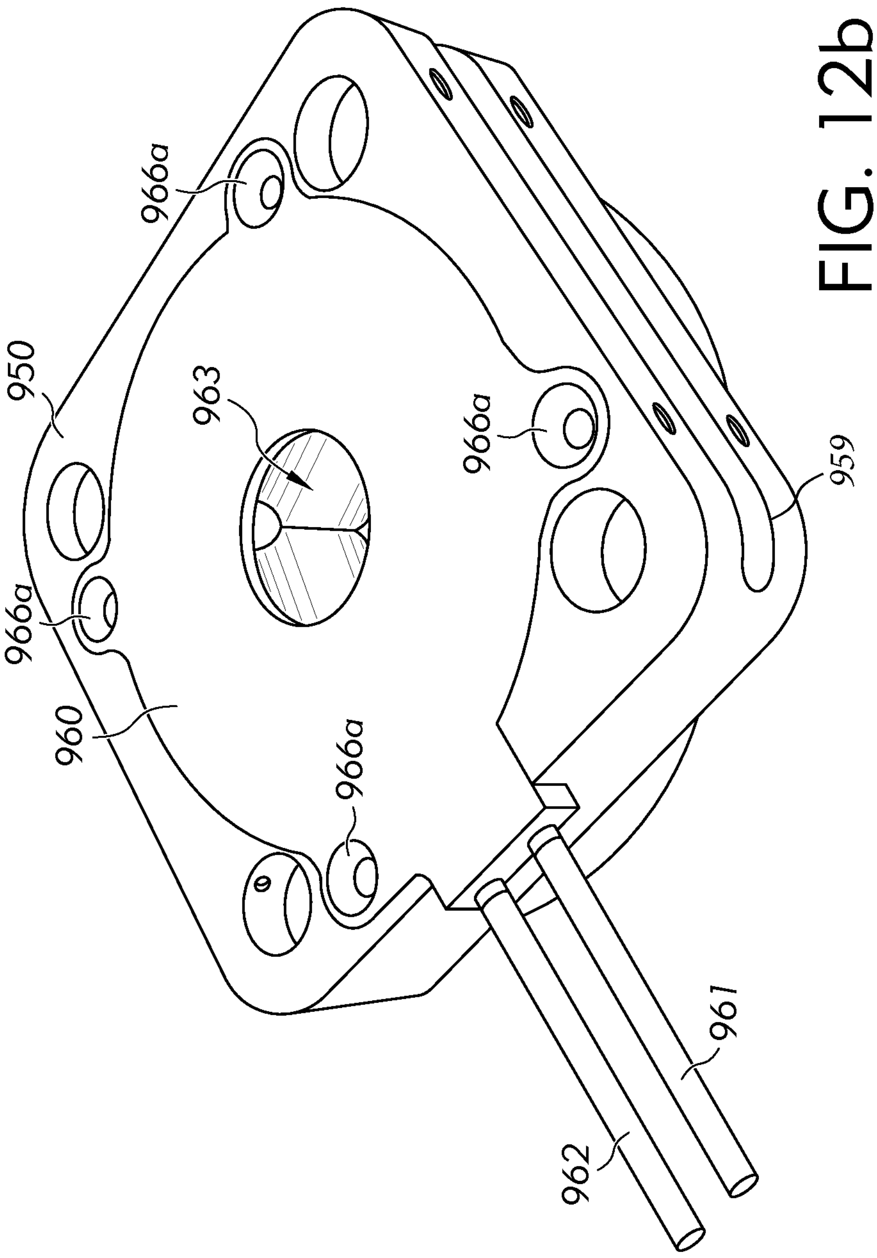
FIG. 12B schematically depicts the cathode housing block and a corresponding fluid cooled insert once the fluid cooled insert has been inserted into an insert recess of the cathode housing block.

FIG. 12A is a perspective view of the cathode housing block 950 positioned next to the fluid cooled insert 960. In embodiments, the cathode housing block 950 may comprise an insert recess 957 shaped to receive the fluid cooled insert 960. In embodiments, the cathode housing block 950 and the fluid cooled insert 960 are configured such that the plasma facing end 950*a* of the cathode housing block 950 and the fluid cooled insert 960 form a flush surface when the fluid cooled insert 960 is positioned in the insert recess 957. The flush surface created when the fluid cooled insert 960 is inserted in the insert recess 957 is shown in FIG. 12B.

In embodiments, the fluid cooled insert 960 is secured to the cathode housing block 950 with a plurality of fasteners (not shown). Accordingly, the fluid cooled insert 960 may comprise a plurality of clearance holes 966, wherein each of the clearance holes 966 are configured to receive a screw or a bolt. Each of the clearance holes 966 may comprise a countersunk hole feature 966*a* on the side of the fluid cooled insert 960 facing the plasma channel 141. Each fastener of the plurality of fasteners may be a countersunk screw. When the countersunk hole features 966*a* are implemented, each of the countersunk screws used to secure the fluid cooled insert 960 to the cathode housing block 950 may maintain the flush surface formed by the plasma facing end 950*a* of the cathode housing block 950 and the fluid cooled insert 960.

Figure 13:
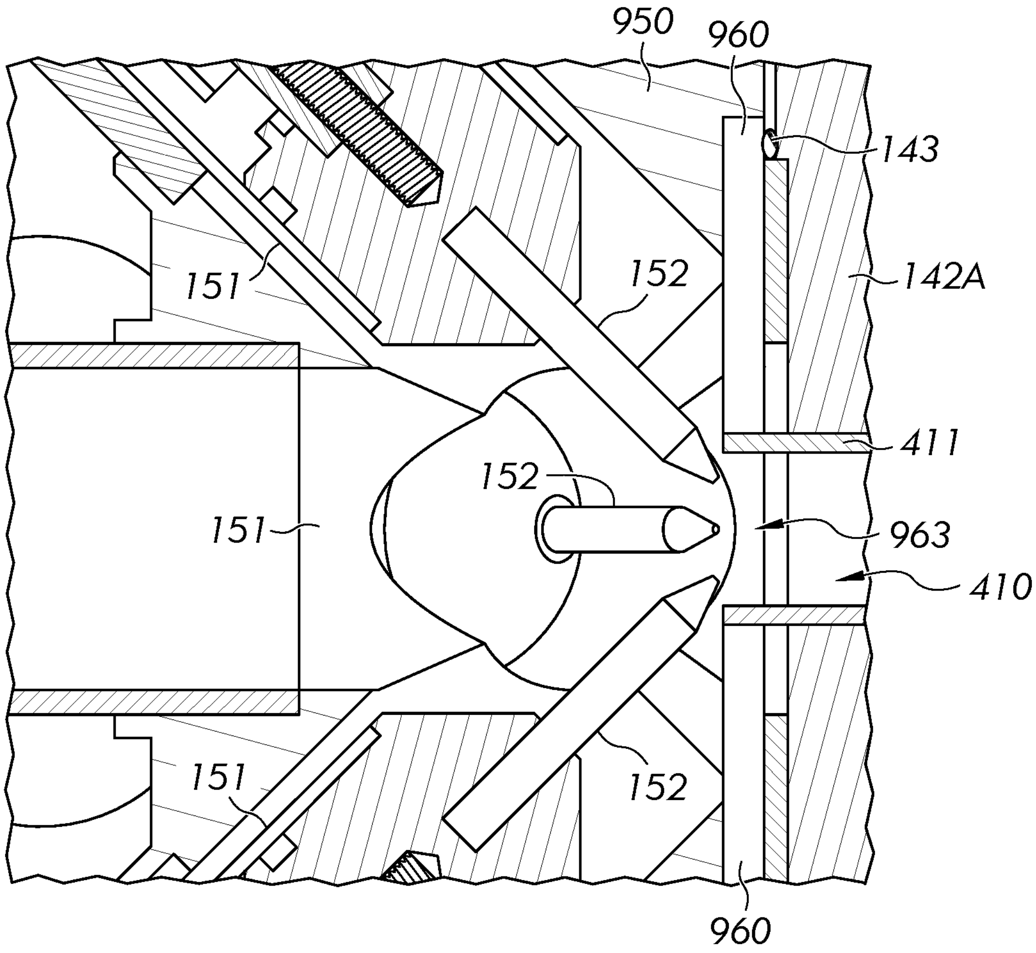
FIG. 13 schematically depicts a side view of the cathode housing block showing a ring of refractory material of the cathode end housing plate extending into an opening of the fluid cooled insert according to embodiments disclosed and described herein.

In embodiments, a ring of refractory metal 411, such as tungsten or molybdenum, may be used to form the inner wall of the aperture 410 of the cathode end cooling plate 142*a*, and thereby, an inner wall of the plasma channel. In a further embodiment, the ring of refractory metal 411 of the cathode end cooling plate 142*a* extends out from the cathode end cooling plate 142*a* and into the opening 963 of the fluid cooled insert 960. In this manner, the fluid cooled insert 960 is provided with a thermal protection barrier between it and the plasma 310 produced from the cathode needles 152 of cathodes 151. FIG. 13 shows a cross-section view of such an embodiment (cooling channel within fluid cooled insert 960 not shown). It should be appreciated that in embodiments of cathode housing blocks 550, 650, 750, and 850, the cathode end cooling plate 142*a* may similarly be configured with the ring of refractory metal 411 that extends out from the cathode end cooling plate 142*a* and into the opening of the cathode housing block.

Finally, it should be understood that any of cooling portions 560, 660, 760, and 860 described in detail above may be in the form of fluid cooled inserts.

The majority of the cooling portion may be constructed from a thermally conductive metal, such as copper, silver, molybdenum, tungsten, or related alloys. Additionally, the cooling portion can be a combination of materials. For example, the cooling portion may consist of a largely copper body with a tungsten layer near the opening adjacent to the plasma channel. Accordingly, in one or more embodiments disclosed and described herein, a ring of refractory metal, such as tungsten or molybdenum, may be used to form the inner wall of the opening of the cooling portion. In embodiments, the cooling portion is constructed from copper.

As used herein, terms such as “substantially,” “approximately,” and the like refer to the subsequently listed property or measurement within normal manufacturing tolerances and imperfections in the relevant field.

According to a first aspect of the present disclosure, a beam accelerator system comprises: an ion accelerator that generates a high-energy ion beam; a low-pressure chamber; an anode adjacent and fluidly connected to the low-pressure chamber; a plasma window adjacent and fluidly connected to the anode, the plasma window comprising a plurality of cooling plates, each cooling plate comprising an aperture that is aligned with an aperture in one or more adjacent cooling plate to form a plasma channel; and a cathode housing block adjacent and fluidly connected to the plasma window, the cathode housing block comprising a cathode target region and a cooling portion. The cooling portion may comprise a fluid inlet, a fluid outlet, a cooling channel fluidly coupling the fluid inlet and the fluid outlet, and an opening adjacent to the plasma window and aligned with a longitudinal axis of the plasma channel. The cooling portion may define a wall of the cathode target region, the wall having a first side and a second side opposite the first side, wherein the first side of the wall faces toward a cathode end cooling plate of the plurality of cooling plates, and the second side of the wall faces toward the cathode target region.

A second aspect may include the first aspect, further comprising an O-ring positioned between the cooling portion of the cathode housing block and the cathode end cooling plate of the plurality of cooling plates, wherein the cooling channel extends within the cooling portion at a radial distance from the longitudinal axis that is less than a radius of the O-ring.

A third aspect may include any one of the first or second aspects, wherein the cooling channel extends within the cooling portion adjacent to the O-ring.

A fourth aspect may include any one of the first through third aspects, wherein the cathode target region comprises a maximum cross-sectional area normal to the longitudinal axis of the plasma channel, the opening of the cooling portion comprises a cross-sectional area normal to the longitudinal axis of the plasma channel, and the maximum cross-sectional area of the target gaseous chamber is larger than the cross-sectional area of the opening of the cooling portion.

A fifth aspect may include any one of the first through fourth aspects, wherein the fluid inlet and the fluid outlet are positioned on the same side of the cooling portion.

A sixth aspect may include any one of the first through fifth aspects, wherein the cooling portion is formed from a thermally conductive metal selected from the group consisting of copper, silver, aluminum, and tungsten.

A seventh aspect may include any one of the first through sixth aspects, wherein the aperture of the cathode end cooling plate comprises an inner wall formed from a refractory metal, and wherein the inner wall extends out from the cathode end cooling plate into the opening of the cooling portion.

An eighth aspect may include any one of the first through seventh aspects, wherein the cooling portion comprises a fluid cooled insert, and wherein a plasma facing end of the cathode housing block comprises an insert recess shaped to receive the fluid cooled insert such that the plasma facing end of the cathode housing block and the fluid cooled insert form a flush surface when the fluid cooled insert is positioned in the insert recess.

A ninth aspect may include the eighth aspect, wherein the inner wall of the fluid cooled insert is formed from a refractory metal.

According to a tenth aspect of the present disclosure, a beam accelerator system comprises: an ion accelerator that generates a high-energy ion beam; a low-pressure chamber; an anode adjacent and fluidly connected to the low-pressure chamber; a plasma window adjacent and fluidly connected to the anode, the plasma window comprising a plurality of cooling plates, each cooling plate comprising an aperture that is aligned with an aperture in one or more adjacent cooling plate to form a plasma channel; a cathode housing block adjacent and fluidly connected to the plasma window, the cathode housing block comprising a cathode target region and a cooling portion, wherein the cooling portion comprises a fluid inlet, a fluid outlet, a cooling channel fluidly coupling the fluid inlet and the fluid outlet, and an opening adjacent to the plasma window and aligned with a longitudinal axis of the plasma channel; and an O-ring positioned between the cooling portion of the cathode housing block and a cathode end cooling plate of the plurality of cooling plates, wherein the cooling channel extends within the cooling portion adjacent to the O-ring.

An eleventh aspect may include the tenth aspect, wherein the cooling channel extends within the cooling portion at a radial distance from the longitudinal axis that is less than a radius of the O-ring.

A twelfth aspect may include any one of the tenth or eleventh aspects, wherein the cathode target region comprises a maximum cross-sectional area normal to the longitudinal axis of the plasma channel, the opening of the cooling portion comprises a cross-sectional area normal to the longitudinal axis of the plasma channel, and the maximum cross-sectional area of the target gaseous chamber is larger than the cross-sectional area of the opening of the cooling portion.

A thirteenth aspect may include any one of the tenth through twelfth aspects, wherein the fluid inlet and the fluid outlet are positioned on the same side of the cooling portion.

A fourteenth aspect may include any one of the tenth through thirteenth aspects, wherein the cooling portion is formed from a thermally conductive metal selected from the group consisting of copper, silver, aluminum, and tungsten.

A fifteenth aspect may include any one of the tenth through fourteenth aspects, wherein the aperture of the cathode end cooling plate comprises an inner wall formed from a refractory metal, and wherein the inner wall extends out from the cathode end cooling plate into the opening of the cooling portion.

A sixteenth aspect may include any one of the tenth through fifteenth aspects, wherein the cooling portion comprises a fluid cooled insert, and wherein a plasma facing end of the cathode housing block comprises an insert recess shaped to receive the fluid cooled insert such that the plasma facing end of the cathode housing block and the fluid cooled insert form a flush surface when the fluid cooled insert is positioned in the insert recess.

A seventeenth aspect may include any one of the tenth through sixteenth aspects, wherein the inner wall of the fluid cooled insert is formed from a refractory metal.

According to an eighteenth aspect of the present disclosure, a beam accelerator system comprises: an ion accelerator that generates a high-energy ion beam; a low-pressure chamber; an anode adjacent and fluidly connected to the low-pressure chamber; a plasma window adjacent and fluidly connected to the anode, the plasma window comprising a plurality of cooling plates, each cooling plate comprising an aperture that is aligned with an aperture in one or more adjacent cooling plate to form a plasma channel; a cathode housing block adjacent and fluidly connected to the plasma window, the cathode housing block comprising a cathode target region and a cooling portion, wherein the cooling portion comprises a fluid inlet, a fluid outlet, a cooling channel fluidly coupling the fluid inlet and the fluid outlet, and an opening adjacent to the plasma window and aligned with a longitudinal axis of the plasma channel; and an O-ring positioned between the cooling portion of the cathode housing block and a cathode end cooling plate of the plurality of cooling plates, wherein the cooling channel extends within the cooling portion at a radial distance from the longitudinal axis that is less than a radius of the O-ring.

A nineteenth aspect may include the eighteenth aspect, wherein the cooling portion comprises a fluid cooled insert, and wherein a plasma facing end of the cathode housing block comprises an insert recess shaped to receive the fluid cooled insert such that the plasma facing end of the cathode housing block and the fluid cooled insert form a flush surface when the fluid cooled insert is positioned in the insert recess.

A twentieth aspect may include any one of the eighteenth or nineteenth aspects, wherein the cooling channel extends within the cooling portion in substantially concentric rings around a longitudinal axis of the plasma channel.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A beam accelerator system comprising:

an ion accelerator that generates a high-energy ion beam;

a low-pressure chamber;

an anode adjacent and fluidly connected to the low-pressure chamber;

a plasma window adjacent and fluidly connected to the anode, the plasma window comprising a plurality of cooling plates, each cooling plate comprising an aperture that is aligned with an aperture in one or more adjacent cooling plate to form a plasma channel; and a cathode housing block adjacent and fluidly connected to the plasma window, the cathode housing block comprising a cathode target region and a cooling portion, wherein:

the cooling portion comprises a fluid inlet, a fluid outlet, a cooling channel fluidly coupling the fluid inlet and the fluid outlet, and an opening adjacent to the plasma window and aligned with a longitudinal axis of the plasma channel; and the cooling portion defines a wall of the cathode target region, the wall having a first side and a second side opposite the first side, wherein the first side of the wall faces toward a cathode end cooling plate of the plurality of cooling plates, and the second side of the wall faces toward the cathode target region.

2. The beam accelerator system of claim 1, further comprising an O-ring positioned between the cooling portion of the cathode housing block and the cathode end cooling plate of the plurality of cooling plates, wherein the cooling channel extends within the cooling portion at a radial distance from the longitudinal axis that is less than a radius of the O-ring.

3. The beam accelerator system of claim 1, further comprising an O-ring positioned between the cooling portion of the cathode housing block and the cathode end cooling plate of the plurality of cooling plates, wherein the cooling channel extends within the cooling portion adjacent to the O-ring.

4. The beam accelerator system of claim 1, wherein the cathode target region comprises a maximum cross-sectional area normal to the longitudinal axis of the plasma channel, the opening of the cooling portion comprises a cross-sectional area normal to the longitudinal axis of the plasma channel, and the maximum cross-sectional area of the target gaseous chamber is larger than the cross-sectional area of the opening of the cooling portion.

5. The beam accelerator system of claim 1, wherein the fluid inlet and the fluid outlet are positioned on the same side of the cooling portion.

6. The beam accelerator system of claim 1, wherein the cooling portion is formed from a thermally conductive metal selected from the group consisting of copper, silver, aluminum, and tungsten.

7. The beam accelerator system of claim 1, wherein the aperture of the cathode end cooling plate comprises an inner wall formed from a refractory metal, and wherein the inner wall extends out from the cathode end cooling plate into the opening of the cooling portion.

8. The beam accelerator system of claim 1, wherein the cooling portion comprises a fluid cooled insert, and wherein a plasma facing end of the cathode housing block comprises an insert recess shaped to receive the fluid cooled insert such that the plasma facing end of the cathode housing block and the fluid cooled insert form a flush surface when the fluid cooled insert is positioned in the insert recess.

9. The beam accelerator system of claim 8, wherein the inner wall of the fluid cooled insert is formed from a refractory metal.

10. A beam accelerator system comprising:
- an ion accelerator that generates a high-energy ion beam;
- a low-pressure chamber;
- an anode adjacent and fluidly connected to the low-pressure chamber;
- a plasma window adjacent and fluidly connected to the anode, the plasma window comprising a plurality of cooling plates, each cooling plate comprising an aperture that is aligned with an aperture in one or more adjacent cooling plate to form a plasma channel;
- a cathode housing block adjacent and fluidly connected to the plasma window, the cathode housing block comprising a cathode target region and a cooling portion, wherein the cooling portion comprises a fluid inlet, a fluid outlet, a cooling channel fluidly coupling the fluid inlet and the fluid outlet, and an opening adjacent to the plasma window and aligned with a longitudinal axis of the plasma channel; and
- an O-ring positioned between the cooling portion of the cathode housing block and a cathode end cooling plate of the plurality of cooling plates, wherein the cooling channel extends within the cooling portion adjacent to the O-ring.

11. The beam accelerator system of claim 10, wherein the cooling channel extends within the cooling portion at a radial distance from the longitudinal axis that is less than a radius of the O-ring.

12. The beam accelerator system of claim 10, wherein the cathode target region comprises a maximum cross-sectional area normal to the longitudinal axis of the plasma channel, the opening of the cooling portion comprises a cross-sectional area normal to the longitudinal axis of the plasma channel, and the maximum cross-sectional area of the target gaseous chamber is larger than the cross-sectional area of the opening of the cooling portion.

13. The beam accelerator system of claim 10, wherein the fluid inlet and the fluid outlet are positioned on the same side of the cooling portion.

14. The beam accelerator system of claim 10, wherein the cooling portion is formed from a thermally conductive metal selected from the group consisting of copper, silver, aluminum, and tungsten.

15. The beam accelerator system of claim 10, wherein the aperture of the cathode end cooling plate comprises an inner wall formed from a refractory metal, and wherein the inner wall extends out from the cathode end cooling plate into the opening of the cooling portion.

16. The beam accelerator system of claim 10, wherein the cooling portion comprises a fluid cooled insert, and wherein a plasma facing end of the cathode housing block comprises an insert recess shaped to receive the fluid cooled insert such that the plasma facing end of the cathode housing block and the fluid cooled insert form a flush surface when the fluid cooled insert is positioned in the insert recess.

17. The beam accelerator system of claim 16, wherein the inner wall of the fluid cooled insert is formed from a refractory metal.

18. A beam accelerator system comprising:
- an ion accelerator that generates a high-energy ion beam;
- a low-pressure chamber;
- an anode adjacent and fluidly connected to the low-pressure chamber;
- a plasma window adjacent and fluidly connected to the anode, the plasma window comprising a plurality of cooling plates, each cooling plate comprising an aperture that is aligned with an aperture in one or more adjacent cooling plate to form a plasma channel;
- a cathode housing block adjacent and fluidly connected to the plasma window, the cathode housing block comprising a cathode target region and a cooling portion, wherein the cooling portion comprises a fluid inlet, a fluid outlet, a cooling channel fluidly coupling the fluid inlet and the fluid outlet, and an opening adjacent to the plasma window and aligned with a longitudinal axis of the plasma channel; and
- an O-ring positioned between the cooling portion of the cathode housing block and a cathode end cooling plate of the plurality of cooling plates, wherein the cooling channel extends within the cooling portion at a radial distance from the longitudinal axis that is less than a radius of the O-ring.

19. The beam accelerator system of claim 18, wherein the cooling portion comprises a fluid cooled insert, and wherein a plasma facing end of the cathode housing block comprises an insert recess shaped to receive the fluid cooled insert such that the plasma facing end of the cathode housing block and the fluid cooled insert form a flush surface when the fluid cooled insert is positioned in the insert recess.

20. The beam accelerator system of claim 18, wherein the cooling channel extends within the cooling portion in concentric rings around a longitudinal axis of the plasma channel.

* * * * *